United States Patent
Kwon et al.

(10) Patent No.: US 12,523,733 B2
(45) Date of Patent: Jan. 13, 2026

(54) DIRECTIONAL ENHANCEMENTS FOR MOBILE AD HOC NETWORKS (MANET) VIA DOPPLER NULL SCANNING (DNS)

(71) Applicant: Rockwell Collins, Inc., Cedar Rapids, IA (US)

(72) Inventors: Tj T. Kwon, Marion, IA (US); William B. Sorsby, Cedar Rapids, IA (US); James A. Stevens, Lucas, TX (US); Eric J. Loren, North Liberty, IA (US)

(73) Assignee: Rockwell Collins, Inc, Cedar Rapids, IA (US)

( * ) Notice: Subject to any disclaimer, the term of this patent is extended or adjusted under 35 U.S.C. 154(b) by 330 days.

(21) Appl. No.: 18/198,671

(22) Filed: May 17, 2023

(65) Prior Publication Data
US 2023/0288521 A1     Sep. 14, 2023

Related U.S. Application Data

(63) Continuation-in-part of application No. 18/198,152, filed on May 16, 2023, which is a continuation-in-part
(Continued)

(51) Int. Cl.
*H04W 56/00* (2009.01)
*G01S 5/00* (2006.01)
(Continued)

(52) U.S. Cl.
CPC .......... *G01S 5/0027* (2013.01); *G01S 13/583* (2013.01); *G01S 13/62* (2013.01);
(Continued)

(58) Field of Classification Search
CPC ...... G01S 5/0027; G01S 13/583; G01S 13/62; G01S 2205/03; G01S 3/14; G01S 5/0284;
(Continued)

(56) References Cited

U.S. PATENT DOCUMENTS

| | | |
|---|---|---|
| 3,025,519 A | 3/1962 | Brown et al. |
| 4,134,113 A | 1/1979 | Powell |

(Continued)

FOREIGN PATENT DOCUMENTS

| | | |
|---|---|---|
| CN | 101330448 A | 12/2008 |
| CN | 101465793 A | 6/2009 |

(Continued)

OTHER PUBLICATIONS

U.S. Appl. No. 17/233,107, filed Apr. 16, 2021, Eric J. Loren.
(Continued)

*Primary Examiner* — Dominic E Rego
(74) *Attorney, Agent, or Firm* — Suiter Swantz IP

(57) ABSTRACT

A system is disclosed. The system may be a directional communications network (e.g., MANET) including at least a receiver or transmitter node. The receiver or transmitter node may include a communications interface with an omnidirectional antenna element and a controller. The controller may include one or more processors and have information of own node velocity and own node orientation relative to a common reference frame known to the receiver or transmitter node prior to the receiver or transmitter node receiving signals from a source. The receiver or transmitter node may be time synchronized to apply Doppler corrections associated with the receiver or transmitter node's own motions relative to the common reference frame. The transmitter and receiver nodes may exchange medium access control (MAC) packets prior to establishing directional communications links, determining bearings to each other via Doppler corrections with respect to the packet exchanges.

17 Claims, 8 Drawing Sheets

Related U.S. Application Data of application No. 18/196,807, filed on May 12, 2023, which is a continuation-in-part of application No. 18/134,950, filed on Apr. 14, 2023, now Pat. No. 12,032,081, which is a continuation of application No. 17/534,061, filed on Nov. 23, 2021, now Pat. No. 11,665,658, said application No. 18/196,807 is a continuation-in-part of application No. 18/130,285, filed on Apr. 3, 2023, which is a continuation-in-part of application No. 17/990,491, filed on Nov. 18, 2022, now Pat. No. 12,335,138, which is a continuation-in-part of application No. 17/957,881, filed on Sep. 30, 2022, now Pat. No. 12,407,393, which is a continuation-in-part of application No. 17/857,920, filed on Jul. 5, 2022, now Pat. No. 12,287,418, which is a continuation-in-part of application No. PCT/US2022/024653, filed on Apr. 13, 2022, which is a continuation of application No. 17/233,107, filed on Apr. 16, 2021, now Pat. No. 11,726,162, said application No. 17/857,920 is a continuation-in-part of application No. 17/541,703, filed on Dec. 3, 2021, now Pat. No. 12,137,048, which is a continuation of application No. 17/408,156, filed on Aug. 20, 2021, now Pat. No. 11,737,121, and a continuation-in-part of application No. 17/233,107, filed on Apr. 16, 2021, now Pat. No. 11,726,162, and a continuation-in-part of application No. 17/079,175, filed on Oct. 23, 2020, now Pat. No. 11,304,084, and a continuation-in-part of application No. 17/020,231, filed on Sep. 14, 2020, now Pat. No. 11,296,966, which is a continuation-in-part of application No. 16/987,671, filed on Aug. 7, 2020, now Pat. No. 11,290,942, and a continuation-in-part of application No. 16/698,230, filed on Nov. 27, 2019, now Pat. No. 10,999,778, said application No. 17/857,920 is a continuation-in-part of application No. 17/534,061, filed on Nov. 23, 2021, now Pat. No. 11,665,658, said application No. 17/957,881 is a continuation-in-part of application No. 17/846,625, filed on Jun. 22, 2022, said application No. 17/990,491 is a continuation-in-part of application No. 17/941,907, filed on Sep. 9, 2022, now Pat. No. 12,316,403, which is a continuation-in-part of application No. 17/940,898, filed on Sep. 8, 2022, now Pat. No. 12,366,625, which is a continuation-in-part of application No. 17/857,920, filed on Jul. 5, 2022, now Pat. No. 12,287,418, said application No. 18/198,152 is a continuation-in-part of application No. 18/196,912, filed on May 12, 2023, which is a continuation-in-part of application No. 18/134,950, filed on Apr. 14, 2023, now Pat. No. 12,032,081, and a continuation-in-part of application No. 18/130,285, filed on Apr. 3, 2023, said application No. 18/198,152 is a continuation-in-part of application No. 18/196,931, filed on May 12, 2023, which is a continuation-in-part of application No. 18/134,950, filed on Apr. 14, 2023, now Pat. No. 12,032,081, and a continuation-in-part of application No. 18/130,285, filed on Apr. 3, 2023, said application No. 18/198,152 is a continuation-in-part of application No. 18/196,765, filed on May 12, 2023, now Pat. No. 12,326,506, which is a continuation-in-part of application No. 18/134,950, filed on Apr. 14, 2023, now Pat. No. 12,032,081, and a continuation-in-part of application No. 18/130,285, filed on Apr. 3, 2023, said application No. 18/198,152 is a continuation-in-part of application No. 18/196,944, filed on May 12, 2023, which is a continuation-in-part of application No. 18/134,950, filed on Apr. 14, 2023, now Pat. No. 12,032,081, and a continuation-in-part of application No. 18/130,285, filed on Apr. 3, 2023, said application No. 18/198,152 is a continuation-in-part of application No. 18/196,786, filed on May 12, 2023, which is a continuation-in-part of application No. 18/134,950, filed on Apr. 14, 2023, now Pat. No. 12,032,081, and a continuation-in-part of application No. 18/130,285, filed on Apr. 3, 2023, said application No. 18/198,152 is a continuation-in-part of application No. 18/196,963, filed on May 12, 2023, which is a continuation-in-part of application No. 18/134,950, filed on Apr. 14, 2023, now Pat. No. 12,032,081, and a continuation-in-part of application No. 18/130,285, filed on Apr. 3, 2023, application No. 18/198,671, filed on May 17, 2023 is a continuation-in-part of application No. 18/198,025, filed on May 16, 2023, which is a continuation-in-part of application No. 18/196,807, filed on May 12, 2023, and a continuation-in-part of application No. 18/196,912, filed on May 12, 2023, and a continuation-in-part of application No. 18/196,931, filed on May 12, 2023, and a continuation-in-part of application No. 18/196,765, filed on May 12, 2023, now Pat. No. 12,326,506, and a continuation-in-part of application No. 18/196,944, filed on May 12, 2023, and a continuation-in-part of application No. 18/196,786, filed on May 12, 2023, and a continuation-in-part of application No. 18/196,936, filed on May 12, 2023.

(60) Provisional application No. 63/344,445, filed on May 20, 2022, provisional application No. 63/400,138, filed on Aug. 23, 2022.

(51) Int. Cl.
    *G01S 13/58* (2006.01)
    *G01S 13/62* (2006.01)

(52) U.S. Cl.
    CPC ... *H04W 56/0015* (2013.01); *H04W 56/0035* (2013.01); *H04W 56/005* (2013.01)

(58) Field of Classification Search
    CPC . G01S 5/12; H04W 56/0015; H04W 56/0035; H04W 56/005; G08G 5/21; G08G 5/55; G08G 5/723; G08G 5/80; G08G 5/25; G08G 5/53
    See application file for complete search history.

(56) References Cited

U.S. PATENT DOCUMENTS

| | | |
|---|---|---|
| 4,399,531 A | 8/1983 | Grande et al. |
| 4,438,439 A | 3/1984 | Shreve |
| 4,806,934 A | 2/1989 | Magoon |
| 5,706,010 A | 1/1998 | Franke |
| 5,835,482 A | 11/1998 | Allen |
| 5,898,902 A | 4/1999 | Tuzov |
| 6,008,758 A | 12/1999 | Campbell |
| 6,072,425 A | 6/2000 | Vopat |
| 6,111,541 A | 8/2000 | Karmel |
| 6,115,394 A | 9/2000 | Balachandran et al. |
| 6,148,219 A | 11/2000 | Engelbrecht et al. |
| 6,195,403 B1 | 2/2001 | Anderson et al. |
| 6,415,154 B1 | 7/2002 | Wang et al. |
| 6,496,940 B1 | 12/2002 | Horst et al. |
| 6,611,773 B2 | 8/2003 | Przydatek et al. |
| 6,662,229 B2 | 12/2003 | Passman et al. |
| 6,718,174 B2 | 4/2004 | Vayanos |

(56) References Cited

U.S. PATENT DOCUMENTS

| | | | |
|---|---|---|---|
| 6,721,290 B1 | 4/2004 | Kondylis et al. |
| 6,744,740 B2 | 6/2004 | Chen |
| 6,845,091 B2 | 1/2005 | Ogier et al. |
| 7,023,818 B1 | 4/2006 | Elliott |
| 7,171,476 B2 | 1/2007 | Maeda et al. |
| 7,242,671 B2 | 7/2007 | Li et al. |
| 7,272,472 B1 | 9/2007 | McElreath |
| 7,299,013 B2 | 11/2007 | Rotta et al. |
| 7,313,401 B2 | 12/2007 | Karmel |
| 7,343,170 B1 | 3/2008 | Feeney et al. |
| 7,417,948 B2 | 8/2008 | Sjöblom |
| 7,418,343 B1 | 8/2008 | McGraw et al. |
| 7,558,575 B2 | 7/2009 | Losh et al. |
| 7,573,835 B2 | 8/2009 | Sahinoglu et al. |
| 7,633,921 B2 | 12/2009 | Thubert et al. |
| 7,636,061 B1 | 12/2009 | Thomas et al. |
| 7,639,652 B1 | 12/2009 | Amis et al. |
| 7,679,551 B2 | 3/2010 | Petovello et al. |
| 7,698,463 B2 | 4/2010 | Ogier et al. |
| 7,719,989 B2 | 5/2010 | Yau |
| 7,729,240 B1 | 6/2010 | Crane et al. |
| 7,787,450 B1 | 8/2010 | Chan et al. |
| 7,881,229 B2 | 2/2011 | Weinstein et al. |
| 7,903,662 B2 | 3/2011 | Cohn |
| 7,983,239 B1 | 7/2011 | Weinstein et al. |
| 8,010,287 B1 | 8/2011 | Frank et al. |
| 8,036,224 B2 | 10/2011 | Axelsson et al. |
| 8,121,741 B2 | 2/2012 | Taft et al. |
| 8,138,626 B2 | 3/2012 | Jonsson et al. |
| 8,159,397 B2 | 4/2012 | Feller et al. |
| 8,159,954 B2 | 4/2012 | Larsson et al. |
| 8,217,836 B1 | 7/2012 | Anderson et al. |
| 8,218,550 B2 | 7/2012 | Axelsson et al. |
| 8,223,660 B2 | 7/2012 | Allan et al. |
| 8,223,868 B2 | 7/2012 | Lee |
| 8,341,289 B2 | 12/2012 | Hellhake et al. |
| 8,369,445 B2 | 2/2013 | Hensley |
| 8,396,686 B2 | 3/2013 | Song et al. |
| 8,490,175 B2 | 7/2013 | Barton et al. |
| 8,553,560 B2 | 10/2013 | Axelsson et al. |
| 8,587,770 B2 | 11/2013 | Johnston et al. |
| 8,599,956 B1 | 12/2013 | Mitchell |
| 8,614,997 B1 | 12/2013 | Herder |
| 8,630,291 B2 | 1/2014 | Shaffer et al. |
| 8,638,008 B2 | 1/2014 | Baldwin et al. |
| 8,717,230 B1 | 5/2014 | Fischi et al. |
| 8,717,935 B2 | 5/2014 | Lindem, III et al. |
| 8,732,338 B2 | 5/2014 | Hutchison et al. |
| 8,798,034 B2 | 8/2014 | Aggarwal et al. |
| 8,824,444 B1 | 9/2014 | Berenberg et al. |
| 8,849,596 B2 | 9/2014 | Ting et al. |
| 8,867,427 B2 | 10/2014 | Taori et al. |
| 8,880,001 B1 | 11/2014 | Hwang et al. |
| 8,909,471 B1 | 12/2014 | Jinkins et al. |
| 8,913,543 B2 | 12/2014 | Zainaldin |
| 8,930,044 B1 | 1/2015 | Peeters et al. |
| 8,942,197 B2 | 1/2015 | Rudnick et al. |
| 8,964,739 B1 | 2/2015 | Wisehart |
| 8,989,326 B2 | 3/2015 | An et al. |
| 9,075,126 B2 | 7/2015 | Robinson |
| 9,179,475 B2 | 11/2015 | Koleszar et al. |
| 9,213,387 B2 | 12/2015 | King et al. |
| 9,246,795 B2 | 1/2016 | Madaiah et al. |
| 9,264,126 B2 | 2/2016 | Foster et al. |
| 9,294,159 B2 | 3/2016 | Duerksen |
| 9,304,198 B1 | 4/2016 | Doerry et al. |
| 9,325,513 B2 | 4/2016 | Liu et al. |
| 9,345,029 B2 | 5/2016 | Monte et al. |
| 9,355,564 B1 | 5/2016 | Tyson et al. |
| 9,430,947 B2 | 8/2016 | Richardson et al. |
| 9,435,884 B2 | 9/2016 | Inoue |
| 9,516,513 B2 | 12/2016 | Saegrov et al. |
| 9,523,761 B1 | 12/2016 | Hoffmann et al. |
| 9,544,162 B2 | 1/2017 | Vasseur et al. |
| 9,621,208 B1 | 4/2017 | Snodgrass et al. |
| 9,628,285 B2 | 4/2017 | Császár |
| 9,693,330 B1 | 6/2017 | Snodgrass et al. |
| 9,696,407 B1 | 7/2017 | Greenleaf et al. |
| 9,713,061 B2 | 7/2017 | Ruiz et al. |
| 9,719,803 B2 | 8/2017 | Ratcliff et al. |
| 9,766,339 B2 | 9/2017 | Robinson et al. |
| 9,858,822 B1 | 1/2018 | Gentry |
| 9,883,348 B1 | 1/2018 | Walker et al. |
| 9,979,462 B2 | 5/2018 | Watson et al. |
| 9,979,635 B2 | 5/2018 | Hellhake et al. |
| 10,067,199 B2 | 9/2018 | Eldridge et al. |
| 10,097,469 B2 | 10/2018 | Hui et al. |
| 10,098,051 B2 | 10/2018 | Mosko et al. |
| 10,205,654 B2 | 2/2019 | Choi et al. |
| 10,236,648 B2 | 3/2019 | Irons et al. |
| 10,257,655 B2 | 4/2019 | Cody |
| 10,365,376 B2 | 7/2019 | Lee et al. |
| 10,382,897 B1 | 8/2019 | Lanes et al. |
| 10,455,521 B2 | 10/2019 | Hudson et al. |
| 10,459,074 B1 | 10/2019 | Omer et al. |
| 10,484,837 B2 | 11/2019 | Navalekar et al. |
| 10,509,130 B2 | 12/2019 | Snyder et al. |
| 10,531,500 B2 | 1/2020 | Ulinskas |
| 10,601,684 B2 | 3/2020 | Hashmi et al. |
| 10,601,713 B1 | 3/2020 | Turgeman et al. |
| 10,609,622 B2 | 3/2020 | Bader et al. |
| 10,620,296 B1 | 4/2020 | Ezal et al. |
| 10,622,713 B2 | 4/2020 | Ma |
| 10,650,688 B1 | 5/2020 | DeRoche |
| 10,719,076 B1 | 7/2020 | Gavrilets et al. |
| 10,763,937 B2 * | 9/2020 | Kusano .............. H04L 27/2675 |
| 10,785,672 B2 | 9/2020 | Kwan et al. |
| 10,798,053 B2 | 10/2020 | Nolan et al. |
| 10,838,070 B1 | 11/2020 | Chapman et al. |
| 10,871,575 B2 | 12/2020 | Petrovic et al. |
| 10,873,429 B1 | 12/2020 | Kwon et al. |
| 10,908,277 B1 | 2/2021 | Roggendorf et al. |
| 10,931,570 B1 | 2/2021 | Kwon et al. |
| 10,965,584 B1 | 3/2021 | Kwon et al. |
| 10,979,348 B1 | 4/2021 | Kwon et al. |
| 10,993,201 B2 | 4/2021 | Luecke |
| 10,999,778 B1 | 5/2021 | Kwon et al. |
| 11,071,039 B2 | 7/2021 | Fallon et al. |
| 11,073,622 B2 | 7/2021 | Cohen |
| 11,082,324 B2 | 8/2021 | Ramanathan et al. |
| 11,129,078 B2 | 9/2021 | Yates et al. |
| 11,138,044 B2 | 10/2021 | Boehm et al. |
| 11,258,520 B2 | 2/2022 | Goergen et al. |
| 11,280,911 B2 | 3/2022 | Kennedy et al. |
| 11,284,295 B1 | 3/2022 | Kwon et al. |
| 11,290,942 B2 | 3/2022 | Kwon et al. |
| 11,411,613 B2 | 8/2022 | Jorgenson et al. |
| 11,415,664 B2 | 8/2022 | Hammes et al. |
| 11,443,638 B2 | 9/2022 | Byxbe |
| 11,500,111 B2 | 11/2022 | Frederiksen et al. |
| 11,528,675 B2 | 12/2022 | Nagaraja et al. |
| 11,536,850 B2 | 12/2022 | Sharma et al. |
| 11,611,375 B2 * | 3/2023 | Newman ................ H04B 7/01 |
| 11,929,820 B2 * | 3/2024 | Khan .................. H04B 7/1855 |
| 11,977,173 B2 | 5/2024 | Loren et al. |
| 12,050,279 B2 | 7/2024 | Stevens et al. |
| 12,078,732 B1 | 9/2024 | Sirianni et al. |
| 12,111,406 B2 | 10/2024 | Sorsby et al. |
| 2002/0018448 A1 | 2/2002 | Amis et al. |
| 2002/0082024 A1 | 6/2002 | Bajikar |
| 2002/0173269 A1 * | 11/2002 | Grayson ............ H04B 7/18502 |
| | | 455/12.1 |
| 2003/0035589 A1 | 2/2003 | Kim |
| 2003/0151513 A1 | 8/2003 | Herrmann et al. |
| 2004/0012859 A1 | 1/2004 | Minefuji |
| 2004/0028016 A1 | 2/2004 | Billhartz |
| 2004/0032363 A1 | 2/2004 | Schantz et al. |
| 2004/0121782 A1 | 6/2004 | Tester |
| 2004/0123228 A1 | 6/2004 | Kikuchi et al. |
| 2004/0192334 A1 | 9/2004 | McBurney et al. |
| 2004/0213239 A1 | 10/2004 | Lin et al. |
| 2004/0246902 A1 | 12/2004 | Weinstein et al. |
| 2005/0025076 A1 | 2/2005 | Chaudhuri et al. |
| 2005/0033789 A1 | 2/2005 | Sirois |

(56) References Cited

U.S. PATENT DOCUMENTS

| | | |
|---|---|---|
| 2005/0047347 A1 | 3/2005 | Lee et al. |
| 2005/0141545 A1 | 6/2005 | Fein et al. |
| 2005/0192058 A1* | 9/2005 | Jung ............... H04W 16/28 455/562.1 |
| 2005/0219950 A1 | 10/2005 | Rowe |
| 2006/0010170 A1 | 1/2006 | Lashley et al. |
| 2006/0056421 A1 | 3/2006 | Zaki |
| 2006/0176847 A1 | 8/2006 | Chen et al. |
| 2006/0239238 A1* | 10/2006 | Fernandez-Corbaton ............... H04W 52/325 370/342 |
| 2007/0021122 A1* | 1/2007 | Lane ............... H04W 56/0025 455/67.16 |
| 2007/0086541 A1 | 4/2007 | Moon et al. |
| 2007/0097880 A1 | 5/2007 | Rajsic |
| 2007/0109182 A1 | 5/2007 | Budic |
| 2007/0109979 A1 | 5/2007 | Fu et al. |
| 2007/0222665 A1 | 9/2007 | Koeneman |
| 2007/0223497 A1 | 9/2007 | Elson et al. |
| 2007/0299950 A1 | 12/2007 | Kulkarni |
| 2008/0068250 A1 | 3/2008 | Brandao et al. |
| 2008/0107034 A1 | 5/2008 | Jetcheva et al. |
| 2008/0117904 A1 | 5/2008 | Radha et al. |
| 2008/0158040 A1 | 7/2008 | Stayton et al. |
| 2008/0219204 A1 | 9/2008 | Lee et al. |
| 2008/0273582 A1 | 11/2008 | Gaal et al. |
| 2008/0291945 A1 | 11/2008 | Luo |
| 2008/0310325 A1 | 12/2008 | Yang |
| 2008/0310354 A1* | 12/2008 | Hansen ............... H04W 72/20 370/329 |
| 2009/0036144 A1* | 2/2009 | Wong ............... H04B 7/01 455/456.3 |
| 2009/0086713 A1 | 4/2009 | Luo |
| 2009/0203337 A1 | 8/2009 | Sisley et al. |
| 2009/0207694 A1 | 8/2009 | Guigne et al. |
| 2009/0232049 A1* | 9/2009 | Singh ............... H04W 84/18 370/328 |
| 2009/0233544 A1 | 9/2009 | Oyman et al. |
| 2009/0271054 A1 | 10/2009 | Dokken |
| 2009/0290572 A1 | 11/2009 | Gonia et al. |
| 2009/0303115 A1 | 12/2009 | Alizadeh-Shabdiz |
| 2009/0310505 A1* | 12/2009 | Tsai ............... G01S 11/02 370/252 |
| 2009/0312038 A1* | 12/2009 | Gildea ............... G01S 19/52 342/357.31 |
| 2009/0318138 A1 | 12/2009 | Zeng et al. |
| 2010/0074101 A1 | 3/2010 | Skalecki et al. |
| 2010/0074141 A1 | 3/2010 | Nguyen |
| 2010/0111065 A1 | 5/2010 | Noh et al. |
| 2010/0226450 A1 | 9/2010 | Tanaka |
| 2010/0246660 A1 | 9/2010 | Matsuo et al. |
| 2011/0006913 A1 | 1/2011 | Chen et al. |
| 2011/0013487 A1 | 1/2011 | Zhou et al. |
| 2011/0053494 A1 | 3/2011 | Kobayakawa |
| 2011/0122849 A1* | 5/2011 | Jain ............... H04W 74/0808 370/336 |
| 2011/0169684 A1 | 7/2011 | Margolin |
| 2011/0188378 A1 | 8/2011 | Collins et al. |
| 2011/0199260 A1* | 8/2011 | Garrett ............... G01S 19/10 342/357.35 |
| 2011/0312279 A1 | 12/2011 | Tsai et al. |
| 2012/0092208 A1 | 4/2012 | LeMire et al. |
| 2012/0098699 A1 | 4/2012 | Calmettes et al. |
| 2012/0168566 A1 | 7/2012 | Lee et al. |
| 2013/0006834 A1 | 1/2013 | Waelbroeck et al. |
| 2013/0069834 A1 | 3/2013 | Duerksen |
| 2013/0094366 A1 | 4/2013 | Lee et al. |
| 2013/0100942 A1 | 4/2013 | Rudnick et al. |
| 2013/0130682 A1 | 5/2013 | Awad et al. |
| 2013/0135137 A1 | 5/2013 | Mulder et al. |
| 2013/0195017 A1 | 8/2013 | Jamadagni et al. |
| 2013/0197835 A1 | 8/2013 | Jonsson et al. |
| 2013/0250808 A1 | 9/2013 | Hui et al. |
| 2014/0017196 A1 | 1/2014 | Han et al. |
| 2014/0018097 A1 | 1/2014 | Goldstein |
| 2014/0029704 A1 | 1/2014 | Becker |
| 2014/0188990 A1 | 7/2014 | Fulks |
| 2014/0229519 A1 | 8/2014 | Dietrich et al. |
| 2014/0236483 A1 | 8/2014 | Beaurepaire et al. |
| 2014/0258201 A1 | 9/2014 | Finlow-Bates |
| 2014/0292568 A1 | 10/2014 | Fleming et al. |
| 2014/0340192 A1 | 11/2014 | Yamada et al. |
| 2015/0010153 A1 | 1/2015 | Robertson |
| 2015/0025818 A1 | 1/2015 | Das et al. |
| 2015/0071332 A1 | 3/2015 | Xu et al. |
| 2015/0094100 A1* | 4/2015 | Opshaug ............... G01S 5/0246 455/456.5 |
| 2015/0222479 A1 | 8/2015 | Kim et al. |
| 2015/0287224 A1 | 10/2015 | Hooper et al. |
| 2015/0296335 A1 | 10/2015 | Joshi et al. |
| 2015/0326689 A1 | 11/2015 | Leppänen et al. |
| 2015/0366470 A1 | 12/2015 | Kim et al. |
| 2016/0139241 A1 | 5/2016 | Holz et al. |
| 2016/0150465 A1 | 5/2016 | Jung et al. |
| 2016/0187458 A1 | 6/2016 | Shah et al. |
| 2016/0189381 A1 | 6/2016 | Rhoads |
| 2016/0265968 A1 | 9/2016 | Boutaud |
| 2016/0373997 A1 | 12/2016 | Petersen et al. |
| 2017/0026797 A1* | 1/2017 | Venkataraman ............... G01S 19/46 |
| 2017/0111266 A1 | 4/2017 | Ko |
| 2017/0111771 A1 | 4/2017 | Haque et al. |
| 2017/0134227 A1 | 5/2017 | Song et al. |
| 2017/0149658 A1 | 5/2017 | Rimhagen et al. |
| 2017/0168163 A1 | 6/2017 | Small |
| 2017/0259920 A1 | 9/2017 | Lai et al. |
| 2017/0366223 A1 | 12/2017 | Stofer et al. |
| 2018/0011200 A1* | 1/2018 | Ramamurthy ............... G01S 19/20 |
| 2018/0013665 A1 | 1/2018 | Ko et al. |
| 2018/0026475 A1 | 1/2018 | Gelonese et al. |
| 2018/0083730 A1* | 3/2018 | Gulati ............... H04L 1/0004 |
| 2018/0091211 A1* | 3/2018 | Hessler ............... H04B 7/0691 |
| 2018/0098263 A1 | 4/2018 | Luo et al. |
| 2018/0146489 A1 | 5/2018 | Jin et al. |
| 2018/0156919 A1 | 6/2018 | Bieber et al. |
| 2018/0234336 A1 | 8/2018 | Schumm et al. |
| 2018/0302807 A1 | 10/2018 | Chen et al. |
| 2018/0317226 A1 | 11/2018 | Sakoda |
| 2019/0098625 A1 | 3/2019 | Johnson et al. |
| 2019/0222302 A1 | 7/2019 | Lin et al. |
| 2019/0251848 A1 | 8/2019 | Sivanesan et al. |
| 2019/0294165 A1 | 9/2019 | Hofmann et al. |
| 2019/0317207 A1 | 10/2019 | Schroder et al. |
| 2019/0332067 A1 | 10/2019 | Zhao et al. |
| 2019/0349172 A1 | 11/2019 | Zhang |
| 2020/0011968 A1 | 1/2020 | Hammes et al. |
| 2020/0018603 A1 | 1/2020 | Deng et al. |
| 2020/0052997 A1 | 2/2020 | Ramanathan et al. |
| 2020/0092949 A1 | 3/2020 | Donepudi et al. |
| 2020/0196309 A1 | 6/2020 | Amouris |
| 2020/0236607 A1 | 7/2020 | Zhu et al. |
| 2020/0292706 A1 | 9/2020 | Hexsel et al. |
| 2020/0350983 A1 | 11/2020 | Alasti et al. |
| 2020/0371247 A1 | 11/2020 | Marmet |
| 2020/0391061 A1 | 12/2020 | Enejehlm et al. |
| 2020/0396708 A1 | 12/2020 | Bharadwaj et al. |
| 2021/0080967 A1 | 3/2021 | Pettinger et al. |
| 2021/0083917 A1 | 3/2021 | Konishi et al. |
| 2021/0153097 A1 | 5/2021 | Du et al. |
| 2021/0201044 A1 | 7/2021 | Herdade et al. |
| 2021/0302956 A1 | 9/2021 | Sudhakaran et al. |
| 2021/0359752 A1 | 11/2021 | Wang et al. |
| 2021/0385879 A1 | 12/2021 | Mahalingam et al. |
| 2021/0405176 A1 | 12/2021 | Luo |
| 2022/0015101 A1 | 1/2022 | Gallagher et al. |
| 2022/0021702 A1 | 1/2022 | Bouthemy |
| 2022/0030511 A1 | 1/2022 | Wang et al. |
| 2022/0038139 A1 | 2/2022 | Löwenmark et al. |
| 2022/0060959 A1 | 2/2022 | Atungsiri et al. |
| 2022/0069901 A1 | 3/2022 | Tian et al. |
| 2022/0085892 A1 | 3/2022 | Sorge |
| 2022/0086818 A1 | 3/2022 | Nam et al. |
| 2022/0143428 A1 | 5/2022 | Goetz et al. |
| 2022/0159741 A1 | 5/2022 | Hoang et al. |

(56) References Cited

U.S. PATENT DOCUMENTS

| | | | |
|---|---|---|---|
| 2022/0173799 A1 | 6/2022 | Wigard et al. | |
| 2022/0198351 A1 | 6/2022 | Beaurepaire et al. | |
| 2022/0268916 A1 | 8/2022 | Nagpal | |
| 2022/0286254 A1 | 9/2022 | Cha et al. | |
| 2022/0295492 A1 | 9/2022 | Shattil | |
| 2022/0317290 A1 | 10/2022 | Kostanic et al. | |
| 2022/0334211 A1 | 10/2022 | Loren et al. | |
| 2022/0342027 A1 | 10/2022 | Loren et al. | |
| 2022/0360320 A1 | 11/2022 | Miao et al. | |
| 2022/0365165 A1 | 11/2022 | Kirchner et al. | |
| 2022/0368410 A1 | 11/2022 | Ma et al. | |
| 2022/0413118 A1 | 12/2022 | Starr et al. | |
| 2023/0033690 A1 | 2/2023 | Factor et al. | |
| 2023/0057666 A1 | 2/2023 | Kwon et al. | |
| 2023/0081728 A1 | 3/2023 | Kwon et al. | |
| 2023/0111316 A1 | 4/2023 | Ma et al. | |
| 2023/0118153 A1 | 4/2023 | Amorim et al. | |
| 2023/0133633 A1 | 5/2023 | Park et al. | |
| 2023/0135149 A1 | 5/2023 | Krishnamurthy et al. | |
| 2023/0179260 A1* | 6/2023 | Abdelghaffar | H04W 72/23 370/329 |
| 2023/0280435 A1 | 9/2023 | Schatz et al. | |
| 2023/0280436 A1 | 9/2023 | Loren et al. | |
| 2023/0280437 A1 | 9/2023 | Kwon et al. | |
| 2023/0288518 A1 | 9/2023 | Graf et al. | |
| 2023/0288519 A1 | 9/2023 | Schatz et al. | |
| 2023/0288521 A1 | 9/2023 | Kwon et al. | |
| 2023/0296716 A1 | 9/2023 | Dean et al. | |
| 2023/0379007 A1 | 11/2023 | Kwon et al. | |
| 2023/0379008 A1 | 11/2023 | Sorsby et al. | |
| 2023/0393229 A1 | 12/2023 | Loren et al. | |
| 2023/0400549 A1* | 12/2023 | Duan | G01S 13/56 |
| 2024/0151800 A1 | 5/2024 | Stevens et al. | |

FOREIGN PATENT DOCUMENTS

| | | |
|---|---|---|
| CN | 101330448 B | 12/2010 |
| CN | 101465793 B | 2/2011 |
| CN | 202257277 U | 5/2012 |
| CN | 101686179 B | 1/2013 |
| CN | 103067286 B | 6/2016 |
| CN | 107645417 A | 1/2018 |
| CN | 110234147 A | 9/2019 |
| CN | 115085799 A | 9/2022 |
| CN | 115688598 A | 2/2023 |
| DE | 102010010935 A1 | 9/2011 |
| EP | 0908022 A2 | 4/1999 |
| EP | 1912392 A2 | 4/2008 |
| EP | 2208084 A4 | 11/2011 |
| EP | 2743726 A1 | 6/2014 |
| EP | 2466964 B1 | 12/2017 |
| EP | 3026961 B1 | 8/2020 |
| GB | 2441610 B | 12/2011 |
| GB | 2542491 A | 3/2017 |
| GB | 2568122 B | 11/2019 |
| GB | 2598610 A | 3/2022 |
| JP | 4290684 B2 | 7/2009 |
| JP | 5164157 B2 | 3/2013 |
| KR | 1020040107702 A | 12/2004 |
| KR | 100568976 B1 | 4/2006 |
| KR | 1020060078814 A | 7/2006 |
| KR | 101231707 B1 | 2/2013 |
| KR | 1020160071964 A | 6/2016 |
| NO | 2012165938 A1 | 12/2012 |
| RU | 2718131 C1 | 3/2020 |
| WO | 2008157609 A3 | 3/2009 |
| WO | 2012062091 A1 | 5/2012 |
| WO | 2015114077 A1 | 8/2015 |
| WO | 2015143604 A1 | 10/2015 |
| WO | 2017101575 A1 | 6/2017 |
| WO | 2018077864 A1 | 5/2018 |
| WO | 2019045767 A1 | 3/2019 |
| WO | 2020117427 A1 | 6/2020 |
| WO | 2020165627 A1 | 8/2020 |
| WO | 2020220233 A1 | 11/2020 |
| WO | 2021251902 A1 | 12/2021 |
| WO | 2022003386 A1 | 1/2022 |
| WO | 2022202858 A1 | 9/2022 |
| WO | 2022221429 A1 | 10/2022 |
| WO | 2022233042 A1 | 11/2022 |
| WO | 2022233314 A1 | 11/2022 |
| WO | 2023001520 A1 | 1/2023 |
| WO | 2023030622 A1 | 3/2023 |
| WO | 2023031904 A1 | 3/2023 |
| WO | 2023047336 A1 | 3/2023 |
| WO | 2023057655 A1 | 4/2023 |
| WO | 2023067552 A1 | 4/2023 |
| WO | 2023068990 A1 | 4/2023 |
| WO | 2023081918 A1 | 5/2023 |

OTHER PUBLICATIONS

U.S. Appl. No. 17/408,156, filed Aug. 20, 2021, Tj T. Kwon.
U.S. Appl. No. 17/534,061, filed Nov. 23, 2021, William B. Sorsby.
U.S. Appl. No. 17/857,920, filed Jul. 5, 2022, Eric J. Loren.
U.S. Appl. No. 63/344,445, filed May 20, 2022, Eric J. Loren.
U.S. Appl. No. 16/369,398, filed Mar. 29, 2019, Kwon.
U.S. Appl. No. 16/987,671, filed Aug. 7, 2021, Kwon et al.
U.S. Appl. No. 17/233,107, filed Apr. 16, 2022, Loren et al.
U.S. Appl. No. 17,541,703, filed Dec. 12, 2021, Kwon et al.
U.S. Appl. No. 17/857,920, filed Jul. 5, 2022, Loren et al.
DSSS in a Nutshell, Basics of Design, Research & Design Hub, Sep. 14, 2020.
Extended Search Report for European Application No. 21188737.7 dated Dec. 10, 2021, 8 pages.
Extended Search Report in European Application No. 21190368.7 dated Jan. 5, 2022, 10 pages.
Kwon et al., "Efficient Flooding with Passive Clustering (PC) in Ad Hoc Networks", Computer Communication Review. 32. 44-56. 10.1145/510726.510730, Aug. 11, 2003, 13 pages.
Martorella, M. et al., Ground Moving Target Imaging via SDAP-ISAR Processing: Review and New Trends. Sensors 2021, 21, 2391. https://doi.org/10.3390/s21072391.
Peng Wang, et al., "Convergence of Satellite and Terrestrial Networks: A Comprehensive Survey networks" IEEEAcess; vol. 4, Dec. 31, 2019.
Pulak K. Chowdhury, et al. "Handover Schemes in Satellite Networks: State-of-the-Art and Future Research Directions" 4th Quarter 2006, vol. 8, No. 4, Oct. 1, 2006.
Seddigh et al., "Dominating sets and neighbor elimination-based broadcasting algorithms in wireless networks", IEE Transactions in Parallel and Distributed Systems, IEEE, USA, vol. 13, No. 1, Jan. 1, 2002 (Jan. 1, 2002), pp. 14-25, XP011094090, ISSN: 1045-9219, DOI 10.1109/71.9800214.
Yi et al., "Passive Clustering in Ad Hoc Networks (PC)", URL: https://tools.ietf,org/html/drafts-yi-manet-pc-00, Nov. 14, 2001, 31 pages.
Seddigh M et al: "Dominating sets and neighbor elimination-based broadcasting algorithms in wireless networks", vol. 13, No. 1, Jan. 1, 2002, pp. 14-25.
Turgut D. et al: "Optimizing clustering algorithm in mobile ad hoc networks using simulated annealing", vol. 3, Mar. 16, 20023, pp. 1492-1497.
Extended European Search Report dated Apr. 4, 2024; European Application No. 21190368.7.

* cited by examiner

DIRECTIONAL ENHANCEMENTS FOR MOBILE AD HOC NETWORKS (MANET) VIA DOPPLER NULL SCANNING (DNS)

CROSS-REFERENCE TO RELATED APPLICATIONS

The present application is related to and claims priority from the following US patent applications:

(a) U.S. patent application Ser. No. 17/233,107, filed Apr. 16, 2021, which is incorporated by reference in its entirety;
(b) PCT Patent Application No. PCT/US22/24653, filed Apr. 13, 2022, which claims priority to U.S. patent application Ser. No. 17/233,107, filed Apr. 16, 2021, all of which are incorporated by reference in its entirety;
(c) U.S. patent application Ser. No. 17/408,156, filed Aug. 20, 2021, which claims priority to U.S. patent application Ser. No. 17/233,107, filed Apr. 16, 2021, all of which are incorporated by reference in its entirety;
(d) U.S. patent application Ser. No. 17/541,703, filed Dec. 3, 2021, which is incorporated by reference in its entirety, which claims priority to:
  U.S. patent application Ser. No. 17/408,156, filed Aug. 20, 2021, which is incorporated by reference in its entirety; and
  U.S. patent application Ser. No. 17/233,107, filed Apr. 16, 2021, all of which is incorporated by reference in its entirety;
(e) U.S. patent application Ser. No. 17/534,061, filed Nov. 23, 2021, which is incorporated by reference in its entirety;
(f) U.S. patent application Ser. No. 63/344,445, filed May 20, 2022, which is incorporated by reference in its entirety;
(g) U.S. patent application Ser. No. 17/857,920, filed Jul. 5, 2022, which is incorporated by reference in its entirety;
(h) U.S. patent application Ser. No. 63/400,138, filed Aug. 23, 2022, which is incorporated by reference in its entirety;
(i) U.S. patent application Ser. No. 17/940,898, filed Sep. 8, 2022, which is incorporated by reference in its entirety;
(j) U.S. patent application Ser. No. 17/941,907, filed Sep. 9, 2022, which is incorporated by reference in its entirety;
(k) U.S. patent application Ser. No. 17/957,881, filed Sep. 30, 2022, which is incorporated by reference in its entirety;
(l) U.S. patent application Ser. No. 17/990,491, filed Nov. 18, 2022, which is incorporated by reference in its entirety;
(m) U.S. patent application Ser. No. 18/130,285, filed Apr. 3, 2023, which is herein incorporated by reference in its entirety;
(n) U.S. patent application Ser. No. 18/134,950, filed Apr. 14, 2023, which is incorporated by reference in its entirety;
(o) U.S. patent application Ser. No. 18/196,807, filed May 12, 2023, which is incorporated by reference in its entirety;
(p) U.S. patent application Ser. No. 18/196,912, filed May 12, 2023, which is incorporated by reference in its entirety;
(q) U.S. patent application Ser. No. 18/196,931, filed May 12, 2023, which is incorporated by reference in its entirety;
(r) U.S. patent application Ser. No. 18/196,765, filed May 12, 2023, which is incorporated by reference in its entirety;
(s) U.S. patent application Ser. No. 18/196,944, filed May 12, 2023, which is incorporated by reference in its entirety;
(t) U.S. patent application Ser. No. 18/196,786, filed May 12, 2023, which is incorporated by reference in its entirety;
(u) U.S. patent application Ser. No. 18/196,936, filed May 12, 2023, which is incorporated by reference in its entirety;
(v) U.S. patent application Ser. No. 18/198,025, filed May 16, 2023, which is incorporated by reference in its entirety; and
(w) U.S. patent application Ser. No. 18/198,152, filed May 16, 2023, which is incorporated by reference in its entirety.

BACKGROUND

Mobile Ad-hoc NETworks (MANET; e.g., "mesh networks") are known in the art as quickly deployable, self-configuring wireless networks which may or may not have a pre-defined network topology. Each communications node within a MANET is presumed to be able to move freely. Additionally, each communications node within a MANET may be required to forward (relay) data packet traffic. Data packet routing and delivery within a MANET may depend on a number of factors including, but not limited to, the number of communications nodes within the network, communications node proximity and mobility, power requirements, network bandwidth, user traffic requirements, timing requirements, and the like.

MANETs face many challenges due to the limited network awareness inherent in such highly dynamic, low-infrastructure communication systems. Given the broad ranges in variable spaces, the challenges lie in making good decisions based on such limited information. For example, in static networks with fixed topologies, protocols can propagate information throughout the network to determine the network structure, but in dynamic topologies this information quickly becomes stale and must be periodically refreshed. It has been suggested that directional systems are the future of MANETs, but the potential of this future has not as yet been fully realized. In addition to topology factors, fast-moving platforms (e.g., communications nodes moving relative to each other) experience a frequency Doppler shift (e.g., offset) due to the relative radial velocity between each set of nodes. This Doppler frequency shift often limits receive sensitivity levels which can be achieved by a node within a mobile network.

Conventional MANETs may be associated with relatively slow discovery times between nodes, e.g., the time required for nodes within the MANET to discover each other, establish relative positioning among each other, and establish communications links among each other. Further, with respect to some directional MANET implementations, it may be necessary or advisable to limit or preclude transmissions in a particular direction to reduce or prevent detection or interception of a transmission by an adversary. Further still, with respect to some MANET implementations it may be necessary or advisable to reuse frequencies or frequency bands (e.g., if available bandwidth is limited).

However, spatial reuse within a MANET can be complicated by the potential of multiple transmissions at a given frequency interfering with one another if the transmitting nodes are not far enough away from each other.

SUMMARY

In a first aspect, a system of at least a transmitter (Tx) node and a receiver (Rx) node in relative motion is disclosed. Each node includes a communications interface with omnidirectional antenna elements and a controller including one or more processors, and each node knows its own-node velocity and own-node orientation. Each node is in relative motion (e.g., one node in motion/one node stationary, both nodes in motion) relative to a common reference frame known to both nodes prior to transmission or reception between nodes. Each node is time synchronized to apply Doppler nulling corrections based on the node's own motion relative to the common reference frame. The Tx node transmits, and the Rx node receives, a control message associated with establishing or initiating a directional communications link to the Rx node. Based on Doppler nulling corrections with respect to the control message, the Rx node determines a relative bearing to the Tx node and establishes a directional communications link to the Tx node based on the determined bearing. The Rx node responds to the transmitted control message with a response control message to the Tx node.

In some embodiments, the control message is a request to tune, and the response control message is a response to tune.

In some embodiments, the control message is a request to send (RTS) and the response control message is a clear to send (CTS).

In some embodiments, the Tx node determines a relative bearing to the Rx node based on Doppler nulling corrections with respect to the response control message, and establishes a directional communications link to the Rx node based on the determined bearing.

In some embodiments, the Tx node determines a range to the Rx node.

In some embodiments, the system includes at least a first and second additional node. Based on Doppler nulling corrections with respect to the control message and/or response control message, the first and second additional node determine a relative bearing to the Tx node, a relative bearing to the Rx node, and/or a relative bearing between the first and second additional nodes.

In some embodiments, the first and second additional nodes establish mutual directional communications links based on the relative bearings to each other.

In some embodiments, the directional communications links between the Tx and Rx nodes are associated with transmission and reception at a particular frequency or frequency band, and the directional communications links between the first and second additional nodes are associated with transmission and reception at the same frequency or frequencies.

In some embodiments, the Tx node has a directional communications link to a silent node, e.g., a high value asset operating under emissions control (EMCON) restrictions or under radio silence. The Tx node, a low value or expendable asset, relays transmissions from the silent node to other nodes to which it has established directional communications links to reduce or preclude detection or interception of transmissions from the silent node.

In some embodiments, the Rx node determines a range to the Tx node.

In some embodiments, the Rx node performs receiver-side Doppler nulling correction by adjusting its receiver frequency according to its own-node velocity vector (e.g., speed, velocity direction).

In some embodiments, the amount of adjustment of the receiver frequency is proportional to an Rx node velocity projection onto the associated Doppler nulling direction.

In some embodiments, the Rx node determines a relative velocity between the Rx and Tx nodes. the Rx node determines a velocity vector (e.g., velocity and direction) of the relative motion of the Tx node.

In some embodiments, the maximum net frequency shift for a receiver-side Doppler nulling correction occurs when the resultant vector (e.g., the Rx node velocity vector minus the Tx node velocity vector) is parallel to the associated Doppler nulling direction.

In some embodiments, the minimum net frequency shift for a receiver-side Doppler nulling correction occurs when the resultant vector (e.g., the Rx node velocity vector minus the Tx node velocity vector) is antiparallel to the associated Doppler nulling direction.

In some embodiments, the relative motion of the Tx and Rx nodes is in two or three dimensions.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Figure 1:
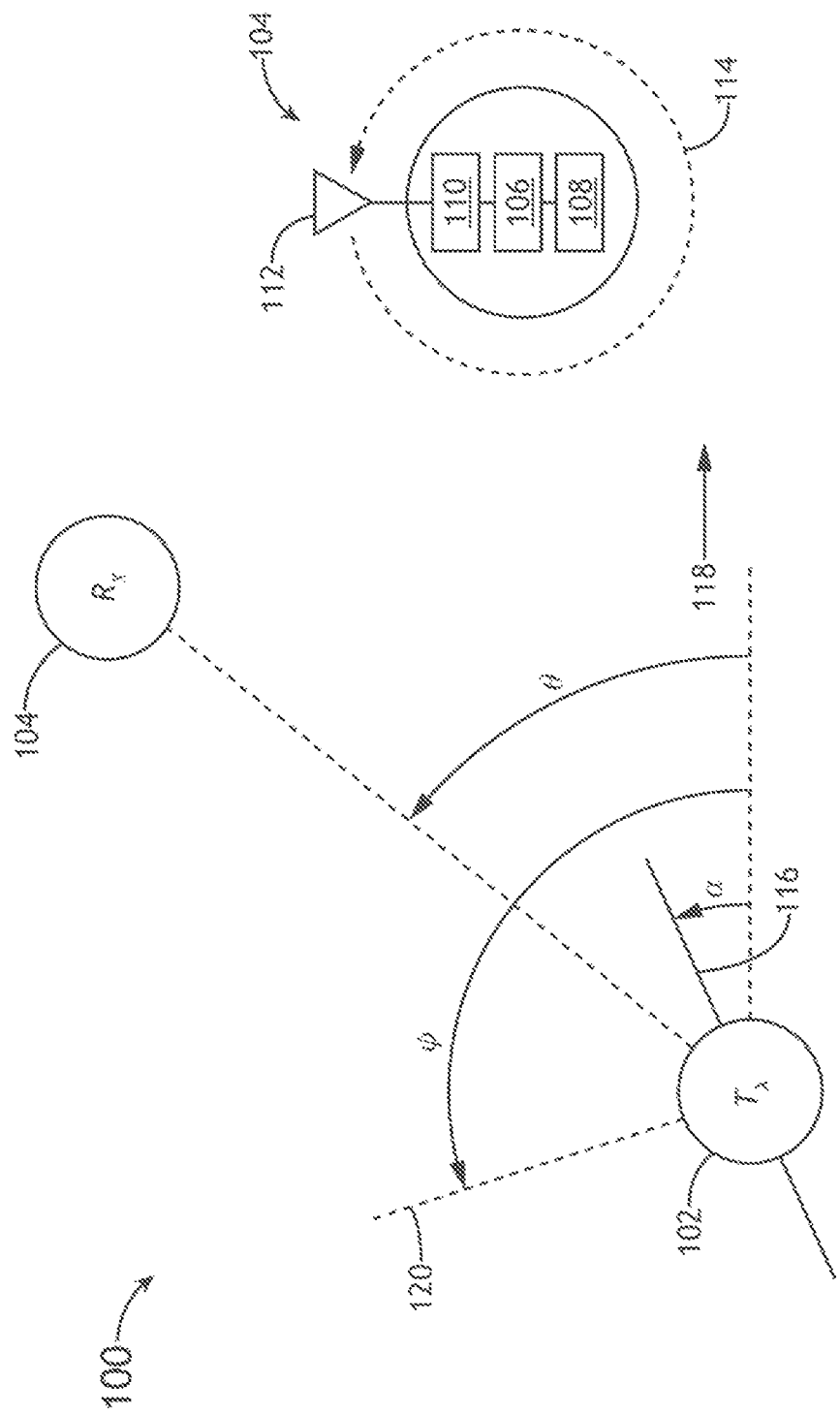
FIG. 1 is a diagrammatic illustration of two nodes in a simplified mobile ad hoc network (MANET) and individual nodes thereof according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment", "in embodiments" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to methods and systems for rapid discovery (e.g., node discovery, link discovery) within a MANET via Doppler nulling (e.g., Doppler null scanning (DNS)) by directional antenna elements (e.g., electronically scanned antennas (ESAs)) of the MANET nodes. In some embodiments, the inventive concepts disclosed herein may be utilized for MANET systems (e.g., to reduce node discovery, relative positioning times, and/or communication interface acquisition times). In some embodiments, the inventive concepts disclosed herein may be utilized to detect whether a node is in a main beam or side lobe of a directional antenna (e.g., ESA antenna).

In some embodiments, the inventive concepts disclosed herein may be utilized with highly directional communication methods to use expendable assets as a relay (e.g., emissions control (EMCON) floating data relay techniques, or other implementations wherein the relay incorporates the inventive concepts disclosed herein). For example, at least one node (e.g., which may transmit signals and/or receive signals) may utilize a directional (rather than omnidirectional) antenna element for improved performance. Embodiments may utilize time synchronized scanning sequences (along with directionality) to improve metrics such as signal-to-noise ratio, signal acquisition time, speed of attaining situational awareness of attributes of surrounding nodes, range, and the like. In some embodiments, synced scanning sequences are used so that all transmitting angles of multiple systems are pointing in the same direction at any point in time during a synced sequence, as well as all the receiving angles, which are pointed in the opposite direction. In this regard, if a pulse happens to be sent towards a particular system, that particular system's receiving angle will be aimed in the opposite direction the pulse was sent from, such that the receiving angle is configured to receive the pulse. Such a configuration may vastly improve the ability to detect a relatively large quantity of nodes in a relatively short period of time over relatively large ranges, over relatively large amounts of noise/interference, and the like. In some embodiments, a zero value or near zero value (e.g., or the like such as a zero crossing) of a calculated net frequency shift of a received signal is used to determine a bearing angle between the source (e.g., Tx node) and the receiving node using a time-of-arrival of the received signal. The bearing angle may be made more accurate by combining (e.g., averaging) it with another bearing angle estimation determined from an angle of peak amplitude gain of the signal. In some embodiments, the inventive concepts disclosed herein may be utilized with spatial reuse of networks (e.g., frequencies or frequency bands of directional MANETs).

For example, in some embodiments, concepts herein are used to reuse frequencies of a network when far enough away from other nodes using that frequency (or when nodes are oriented in sufficiently different directions) so as to not interfere with the signal of other nodes using that frequency. For example, a threshold metric (pre-determined, dynamic, etc.) may be used to determine whether a node is far enough away to use a frequency (and/or frequency bandwidth spectrum) based on relative position of the node relative to the network or other nodes on the network.

It is noted that U.S. patent application Ser. No. 17/857, 920, filed Jul. 5, 2022 and which application is herein incorporated by reference in its entirety, provides at least some examples of Doppler nulling methods and systems which may be better understood, in a nonlimiting manner, by reference to FIGS. 1-7 and accompanying text therein (FIG. 1 of which, and accompanying text, is included here). Such embodiments and examples are provided for illustrative purposes and are not to be construed as necessarily limiting. For instance, in embodiments the transmitter node may be stationary rather than moving and/or vice versa; similarly, relative motion may be in two dimensions or in three dimensions. As disclosed in detail in U.S. patent application Ser. No. 17/857,920, in some embodiments, a stationary receiver may determine a cooperative transmitter's direction and velocity vector by using a Doppler null scanning approach in two dimensions. A benefit of the approach is the spatial awareness without exchanging explicit positional information. Other benefits include discovery, synchronization, and Doppler corrections which are important for communications. Some embodiment may combine coordinated transmitter frequency shifts along with the transmitter's motion induced Doppler frequency shift to produce unique net frequency shift signal characteristics resolvable using a stationary receiver to achieve spatial awareness. Further, some embodiment may include a three-dimensional (3D) approach with the receiver and the transmitter in motion.

Some embodiments may use analysis performed in a common reference frame (e.g., a common inertial reference frame, such as the Earth, which may ignore the curvature of Earth), and it is assumed that the communications system for each of the transmitter and receiver is informed by the platform of its own velocity and orientation. The approach described herein can be used for discovery and tracking, but the discussion here focuses on discovery which is often the most challenging aspect.

The meaning of the 'Doppler Null' can be explained in part through a review of the two-dimensional (2D) case without the receiver motion, and then may be expounded on by a review of adding the receiver motion to the 2D case, and then including receiver motion in the 3D case.

The Doppler frequency shift of a communications signal is proportional to the radial velocity between transmitter and receiver, and any significant Doppler shift is typically a hindrance that should be considered by system designers. In contrast, some embodiments utilize the Doppler effect to discriminate between directions with the resolution dictated by selected design parameters. Furthermore, such embodiments use the profile of the net frequency shift as the predetermined 'Null' direction scans through the angle space. The resultant profile is sinusoidal with an amplitude that provides the transmitter's speed, a zero net frequency shift when the 'Null' direction aligns with the receiver, and a minimum indicating the direction of the transmitter's velocity. It should be noted that that the transmitter cannot correct for Doppler in all directions at one time so signal characteristics are different in each direction and are different for different transmitter velocities as well. It is exactly these characteristics that the receiver uses to determine spatial awareness. The received signal has temporal spatial characteristics that can be mapped to the transmitter's direction and velocity. This approach utilizes the concept of a 'Null' which is simply the direction where the transmitter perfectly corrects for its own Doppler shift. The same 'Nulling' protocol runs on each node and scans through all directions, such as via a scanning sequence of a protocol. Here we arbitrarily illustrate the scanning with discrete successive steps of 10 degrees but in a real system; however, it should be understood that any suitable step size of degrees may be used for Doppler null scanning.

As already mentioned, one of the contributions of some embodiments is passive spatial awareness. Traditionally, spatial information for neighbor nodes (based on a global positioning system (GPS) and/or gyros and accelerometers) can be learned via data communication. Unfortunately, spatial awareness via data communication, referred to as active spatial awareness is possible only after communication has already been established, not while discovering those neighbor nodes. Data communication is only possible after the signals for neighbor nodes have been discovered, synchronized and Doppler corrected. In contrast, in some embodiments, the passive spatial awareness described herein may be performed using only synchronization bits associated with acquisition. This process can be viewed as physical layer overhead and typically requires much lower bandwidth (and/or less signal to noise ratio (SNR)) compared to explicit data transfers.

Traditionally, network topology is harvested via a series of data packet exchanges (e.g., hello messaging and link status advertisements). The passive spatial awareness may eliminate hello messaging completely and provide a wider local topology which is beyond the coverage of hello messaging. By utilizing passive spatial awareness, highly efficient mobile ad hoc networking (MANET) is possible. Embodiments may improve the functioning of a network itself.

Referring to FIG. 1, a multi-node communications network 100 is disclosed. The multi-node communications network 100 may include multiple communications nodes, e.g., a transmitter (Tx) node 102 and a receiver (Rx) node 104.

In embodiments, the multi-node communications network 100 may include any multi-node communications network known in the art. For example, the multi-node communications network 100 may include a mobile ad-hoc network (MANET) in which the Tx and Rx nodes 102, 104 (as well as every other communications node within the multi-node communications network) is able to move freely and independently. Similarly, the Tx and Rx nodes 102, 104 may include any communications node known in the art which may be communicatively coupled. In this regard, the Tx and Rx nodes 102, 104 may include any communications node known in the art for transmitting/transceiving data packets. For example, the Tx and Rx nodes 102, 104 may include, but are not limited to, radios (such as on a vehicle or on a person), mobile phones, smart phones, tablets, smart watches, laptops, and the like. In embodiments, the Rx node 104 of the multi-node communications network 100 may each include, but are not limited to, a respective controller 106 (e.g., control processor), memory 108, communication interface 110, and antenna elements 112. (In embodiments, all attributes, capabilities, etc. of the Rx node 104 described below may similarly apply to the Tx node 102, and to any other communication node of the multi-node communication network 100.)

In embodiments, the controller 106 provides processing functionality for at least the Rx node 104 and can include any number of processors, micro-controllers, circuitry, field programmable gate array (FPGA) or other processing systems, and resident or external memory for storing data, executable code, and other information accessed or generated by the Rx node 104. The controller 106 can execute one or more software programs embodied in a non-transitory computer readable medium (e.g., memory 108) that implement techniques described herein. The controller 106 is not limited by the materials from which it is formed or the processing mechanisms employed therein and, as such, can be implemented via semiconductor(s) and/or transistors (e.g., using electronic integrated circuit (IC) components), and so forth.

In embodiments, the memory 108 can be an example of tangible, computer-readable storage medium that provides storage functionality to store various data and/or program code associated with operation of the Rx node 104 and/or controller 106, such as software programs and/or code segments, or other data to instruct the controller 106, and possibly other components of the Rx node 104, to perform the functionality described herein. Thus, the memory 108 can store data, such as a program of instructions for operating the Rx node 104, including its components (e.g., controller 106, communication interface 110, antenna elements 112, etc.), and so forth. It should be noted that while a single memory 108 is described, a wide variety of types and combinations of memory (e.g., tangible, non-transitory memory) can be employed. The memory 108 can be integral with the controller 106, can comprise stand-alone memory, or can be a combination of both. Some examples of the memory 108 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

In embodiments, the communication interface 110 can be operatively configured to communicate with components of the Rx node 104. For example, the communication interface 110 can be configured to retrieve data from the controller 106 or other devices (e.g., the Tx node 102 and/or other nodes), transmit data for storage in the memory 108, retrieve data from storage in the memory, and so forth. The communication interface 110 can also be communicatively coupled with the controller 106 to facilitate data transfer between components of the Rx node 104 and the controller 106. It should be noted that while the communication interface 110 is described as a component of the Rx node 104, one or more components of the communication interface 110 can be implemented as external components communicatively coupled to the Rx node 104 via a wired and/or wireless connection. The Rx node 104 can also include and/or connect to one or more input/output (I/O) devices. In embodiments, the communication interface 110 includes or is coupled to a transmitter, receiver, transceiver, physical connection interface, or any combination thereof.

It is contemplated herein that the communication interface 110 of the Rx node 104 may be configured to communicatively couple to additional communication interfaces 110 of additional communications nodes (e.g., the Tx node 102) of the multi-node communications network 100 using any wireless communication techniques known in the art including, but not limited to, GSM, GPRS, CDMA, EV-DO, EDGE, WiMAX, 3G, 4G, 4G LTE, 5G, WiFi protocols, RF, LoRa, and the like.

In embodiments, the antenna elements 112 may include directional or omnidirectional antenna elements capable of being steered or otherwise directed (e.g., via the communications interface 110) for spatial scanning in a full 360-degree arc (114) relative to the Rx node 104 (or even less than a full 360-degree arc).

In embodiments, the Tx node 102 and Rx node 104 may one or both be moving in an arbitrary direction at an arbitrary speed, and may similarly be moving relative to each other. For example, the Tx node 102 may be moving relative to the Rx node 104 according to a velocity vector 116 ($|\vec{V_T}|$), at a relative velocity $V_T$ and a relative angular direction (an angle $\alpha$ relative to an arbitrary direction 118 (e.g., due east); $\theta$ may be the angular direction of the Rx node relative to due east.

In embodiments, the Tx node 102 may implement a Doppler nulling protocol. For example, the Tx node 102 may adjust its transmit frequency to counter the Doppler frequency offset such that there is no net frequency offset (e.g., "Doppler null") in a Doppler nulling direction 120 (e.g., at an angle $\phi$ relative to the arbitrary direction 118). The transmitting waveform (e.g., the communications interface 110 of the Tx node 102) may be informed by the platform (e.g., the controller 106) of its velocity vector and orientation (e.g., $\alpha$, $|\vec{V_T}|$) and may adjust its transmitting frequency to remove the Doppler frequency shift at each Doppler nulling direction 120 and angle $\phi$.

To illustrate aspects of some embodiments, we show the 2D dependence of the net frequency shift for a stationary receiver as a function of Null direction across the horizon, as shown in a top-down view of FIG. 1, where the receiver node 104 is stationary and positioned $\theta$ from east relative to the transmitter, the transmitter node 102 is moving with a speed $|\vec{V_T}|$ and direction $\alpha$ from east and a snapshot of the scanning $\phi$ which is the 'Null' direction, exemplarily shown as 100 degrees in this picture.

The Doppler shift is a physical phenomenon due to motion and can be considered as a channel effect. In this example the transmitter node 102 is the only moving object, so it is the only source of Doppler shift. The Doppler frequency shift as seen by the receiver node 104 due to the transmitter node 102 motion is:

$$\frac{\Delta f_{DOPPLER}}{f} = \frac{|\vec{V_T}|}{c} \cos\cos(\theta - \alpha),$$

where c is the speed of light.

The other factor is the transmitter frequency adjustment term that should exactly compensate the Doppler shift when the 'Null' direction aligns with the receiver direction. It is the job of the transmitter node 102 to adjust its transmit frequency according to its own speed ($|\vec{V_T}|$), and velocity direction $\alpha$. That transmitter frequency adjustment ($\Delta f_T$) is proportional to the velocity projection onto the 'Null' direction $\phi$ (120) and is:

$$\frac{\Delta f_T}{f} = -\frac{|\vec{V_T}|}{c}\cos(\varphi - \alpha).$$

The net frequency shift seen by the receiver is the sum of the two terms:

$$\frac{\Delta f_{net}}{f} = \frac{|\vec{V_T}|}{c}[\cos(\theta - \alpha) - \cos(\varphi - \alpha)].$$

It is assumed that the velocity vector and the direction changes slowly compared to the periodic measurement of $\Delta f_{net}$. Under those conditions, the unknown parameters (from the perspective of the receiver node 104) of $\alpha$, $|\vec{V_T}|$, and $\theta$ are constants.

Furthermore, it is assumed that the receiver node 104 has an implementation that resolves the frequency of the incoming signal, as would be understood to one of ordinary skill in the art.

This sentence may mark an end to the (at least partially) reproduced language from U.S. patent application Ser. No. 17/857,920 corresponding to the (at least partially) reproduced FIGS. 1-7. However, note that this paragraph is nonlimiting, and changes may have been made and language added or removed, and not all the language above or corresponding figures above are necessarily reproduced from U.S. patent application Ser. No. 17/857,920.

Directional radio frequency (RF) networks often must spend significant time scanning the physical space over which potential RF network signals may exist. For example, a system scanning spherical space in azimuth and elevation may require numerous discrete time intervals to accomplish the task. Generally, a receiver dwells for a finite amount of time within each spatial sector looking for a desired signal; hence, total discovery time becomes dwell time multiplied by the number of discrete time intervals needed for the receiver to search the entire physical space. Because scanning may be a lengthy process, often it becomes necessary to sacrifice other important system performance metrics to ensure timely discovery performance.

Omnidirectional doppler nulling may be an enabling technology for reducing discovery time within directional networks, thereby allowing for improvement in other performance metrics as well. Because of the significantly improved discovery time, directional Doppler-nulling may also be enabling technology for low-probability of detection (LPD) directional networks.

Transmission of explicit position information (e.g., GPS coordinates using two-way higher-bandwidth communications) and/or velocity information is not necessarily needed to obtain such information when using Doppler-nulling. In embodiments, Doppler is minimized (or "nulled") via Doppler corrections in each direction an antenna is pointing based on at least a velocity of a node (e.g., which may be equally true for transmitter and receiver). Further, improved communication between nodes becomes possible whenever antennas are pointing toward each other. In embodiments, range to another node can be determined from the use of precisely-defined transmission intervals, as the transmission time in each can be known, a priori, to both the transmitter and receiver. With bearing angle, range, and relative velocity between nodes known via the Doppler-nulling protocol, it becomes possible to precisely discover and track another node's position without using any explicit data transfer (e.g., WiFi, Bluetooth, longer range similar bandwidth aerospace communication protocols, and/or the like).

Examples of doppler nulling methods include, but are not limited to, methods and other descriptions (e.g., at least some theory and mathematical basis) are disclosed in U.S. patent application Ser. No. 17/233,107, filed Apr. 16, 2021, which is herein incorporated by reference in its entirety; U.S. patent application Ser. No. 17/534,061, filed Nov. 23, 2021, which is herein incorporated by reference in its entirety; and U.S. patent application Ser. No. 17/857,920, filed Jul. 5, 2022, which is herein incorporated by reference in its entirety; and U.S. patent application Ser. No. 17/941,907, filed Sep. 9, 2022, which is herein incorporated by reference in its entirety. In embodiments, doppler nulling methods allow for benefits such as, but not limited to, relatively quickly and/or efficiently detecting transmitter nodes and determining transmitter node attributes (e.g., transmitter node speed, transmitter node bearing, relative bearing of transmitter node relative to receiver node, relative distance of transmitter node relative to receiver node, and the like).

Figure 2:
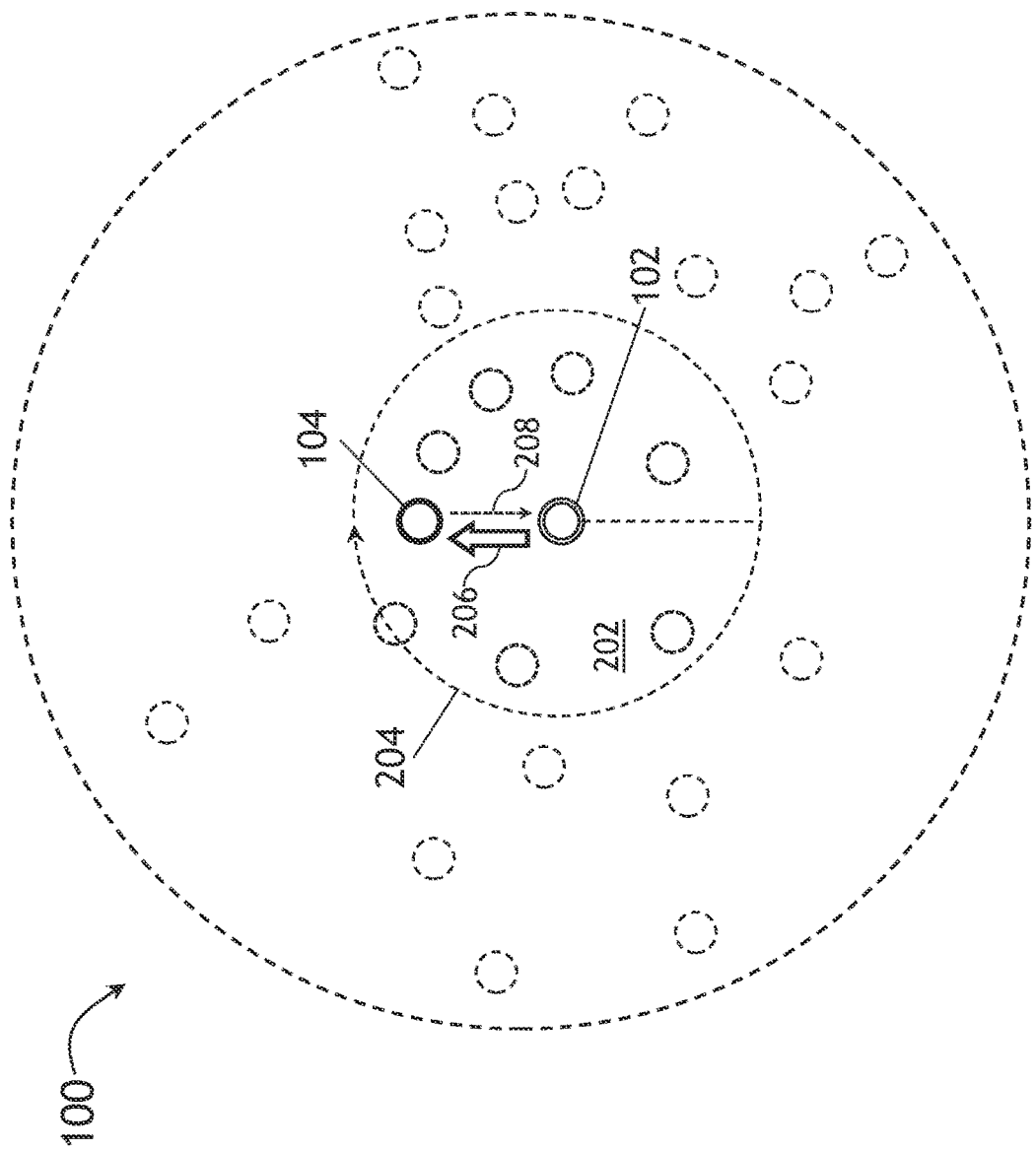
FIG. 2 is a diagrammatic illustration of a transmitter (Tx) node transmitting a control message according to example embodiments of this disclosure.

Referring to FIG. 2, the multi-node communications network 100 is shown.

In embodiments, the Tx node 102 may be disposed within a cluster 202 of nodes defined by a transmission range 204 (e.g., transmission radius), which may be adjustable by the Tx node 102 (e.g., via adjustments to its transmitting power). With respect to the Tx node 102, an Rx node 104, and other nodes within the cluster 202, the antenna elements (112, FIG. 1) of each node may be omnidirectional antenna elements capable of transmission through a 360-degree range around the associated node. In embodiments, the topology of the multi-node communications network 100 may be substantially two-dimensional or three-dimensional as described above. Further, the multi-node communications network 100 may be a directional MANET wherein member nodes transmit and receive via narrow-beam directional communications links.

In embodiments, the Tx node 102 may attempt to discover, and establish directional communications links to, other nodes within its cluster 202 or transmission range 204. For example, the Tx node 102 may transmit a control message 206, e.g., a Request to Tune (RTT) or a Request to Send (RTS) including one or more medium access control (MAC) packets. The Rx node 104 may detect or receive the control message 206 and discover the Tx node 102 via Doppler corrections performed with respect to the control message 206, thereby determining a bearing 208 to the Tx node.

Figure 3:
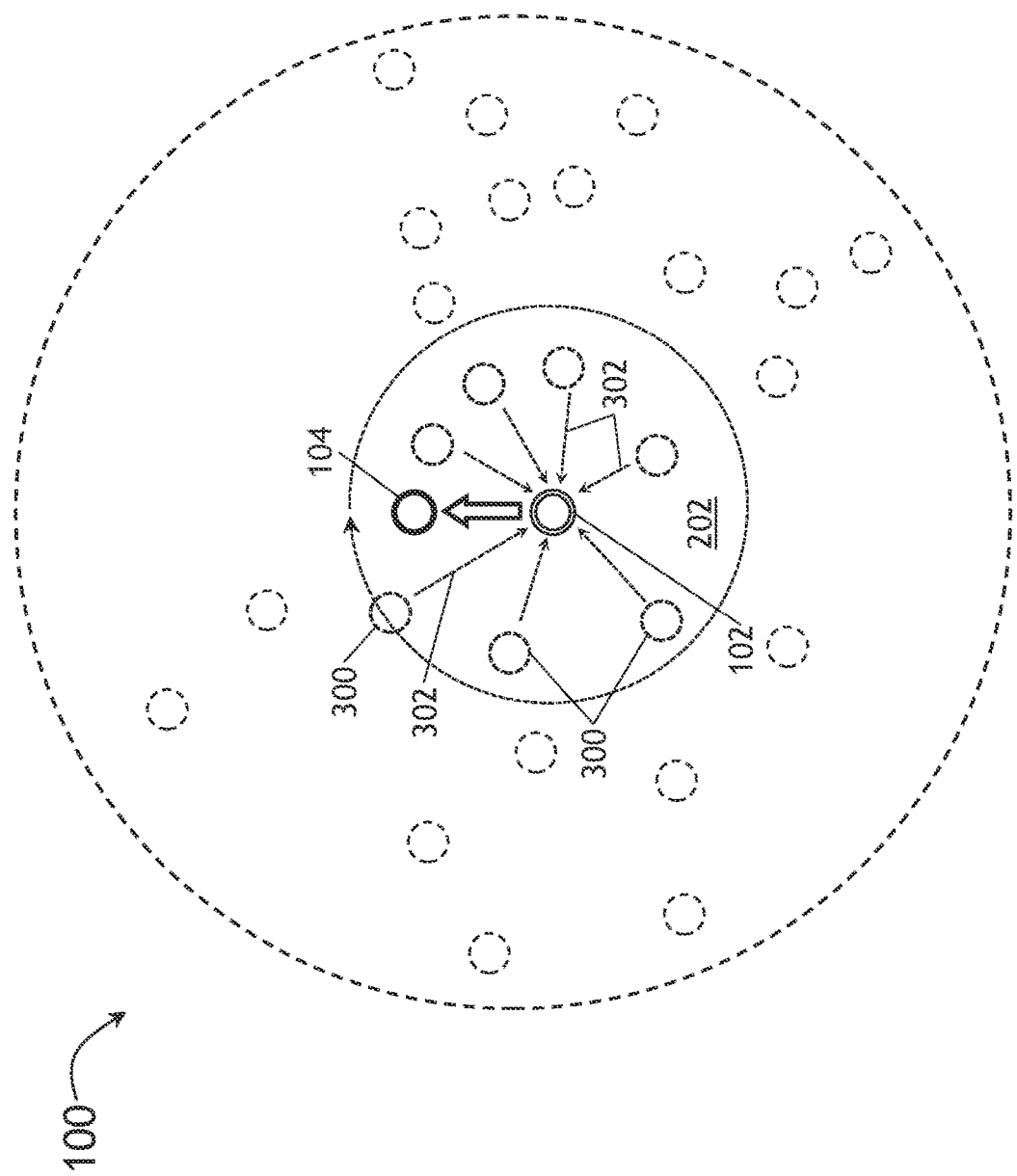
FIG. 3 is a diagrammatic illustration of node discovery via Doppler corrections with respect to the control message of FIG. 2 according to example embodiments of this disclosure.

In embodiments, referring also to FIG. 3, additional nodes 300 within the cluster 202 or within the transmission range 204 of the Tx node 102 may likewise detect the control message 206. For example, additional nodes 300 may likewise determine a bearing 302 to the Tx node 102 based on Doppler corrections with respect to the control message 206. In some embodiments, having discovered the Tx node 102 and determined a bearing 302 thereto, the additional nodes 300 may attempt to establish directional communications links with the Tx node.

Figure 4:
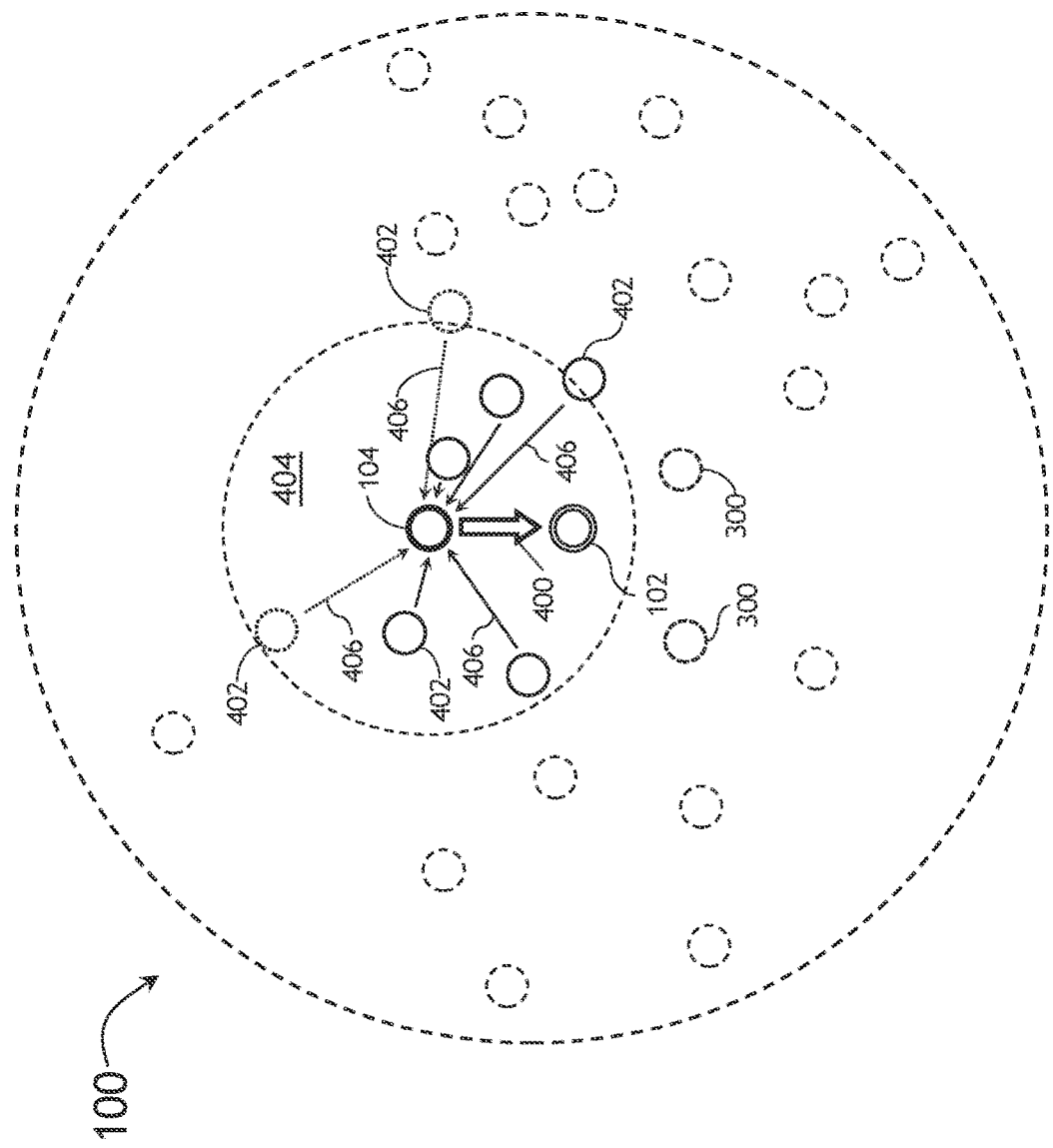
FIG. 4 is a diagrammatic illustration of a receiver (Rx) node responding to the control message of FIG. 2 with a response control message.

Referring also to FIG. 4, in embodiments the Rx node 104 may respond to the RTS 206 by transmitting a response control message 400, e.g., a Response to Tune (RTT) or a Clear to Send 400 (CTS) comprising one or more MAC packets. For example, having determined a bearing 208 to the Tx node 102, the Rx node 104 may further establish a narrow-beam directional communications link to the Tx node. In embodiments, additional nodes 402 within the transmission range 404 of the Rx node 104 may likewise detect and/or receive the control message 400, determining a bearing 406 to the Rx node based on Doppler corrections with respect to the control message. For example, the additional nodes 402, having established a bearing 406 to the Rx node 104, may further establish directional communications links to the Rx node based on the determined bearing.

Figure 5:
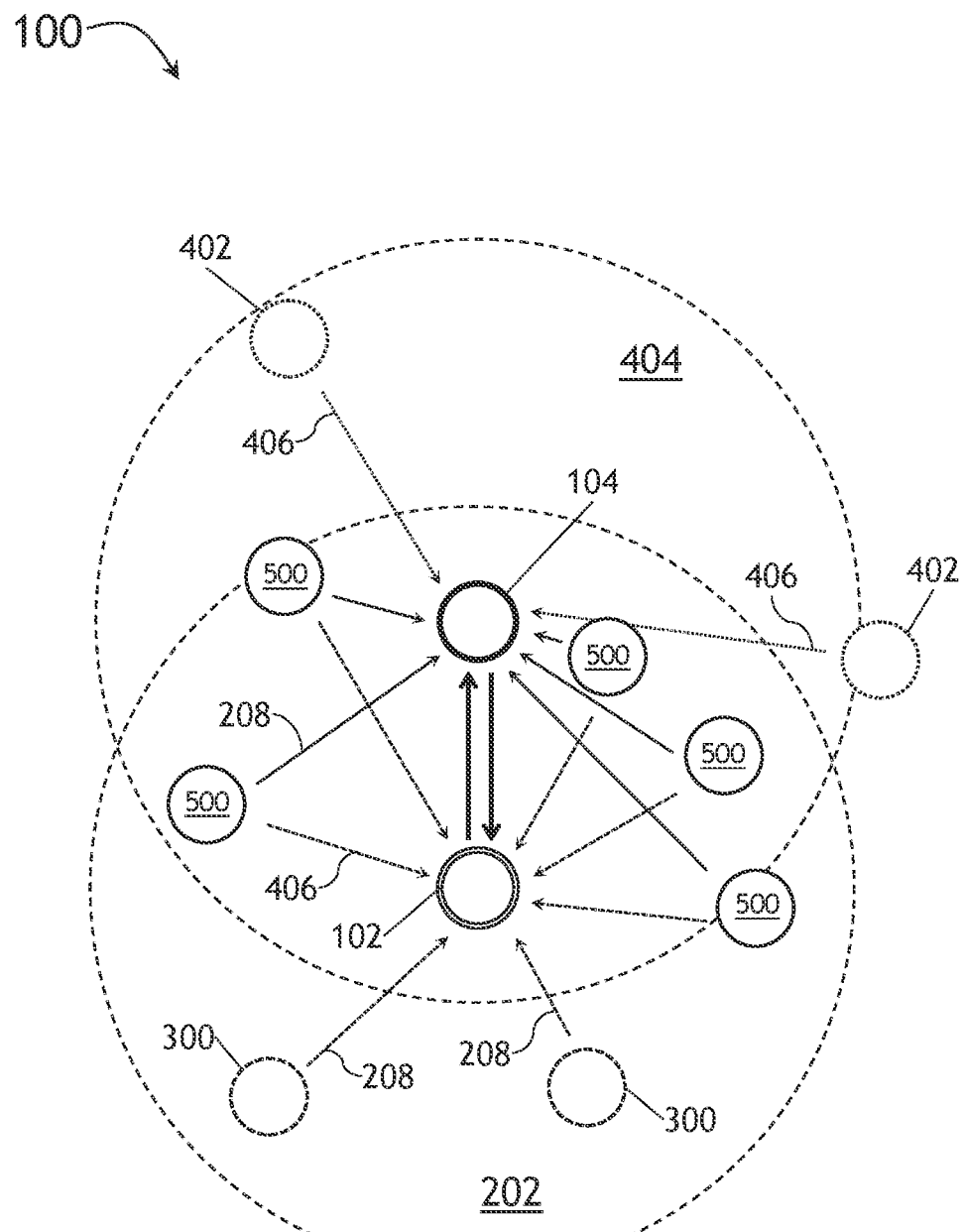
FIG. 5 is a diagrammatic illustration of directional link establishment between the Tx and Rx nodes of FIG. 4, and node discovery via Doppler corrections with respect to the control message and response control message of FIGS. 2 and 4 respectively, according to example embodiments of this disclosure.

Referring also to FIG. 5, the cluster (202, FIG. 2) relative to the Tx node 102 (e.g., and including network nodes within the respective transmission ranges 204, 404 of the Tx node 102 and Rx node 104), may include, in addition to the Tx and Rx nodes, additional nodes 300 (e.g., which may have determined a bearing 208 to the Tx node 102), additional nodes 402 (e.g., which may have determined a bearing 406 to the Rx node 104), and additional nodes 500 (e.g., which may have determined a bearing to both the Tx node and Rx node). In some embodiments, the additional nodes 300, 402, 500 may likewise discover each other, and/or establish directional communications links among each other, based on additional control message exchanges of MAC packets and Doppler corrections based on said control message exchanges.

Figure 6A:
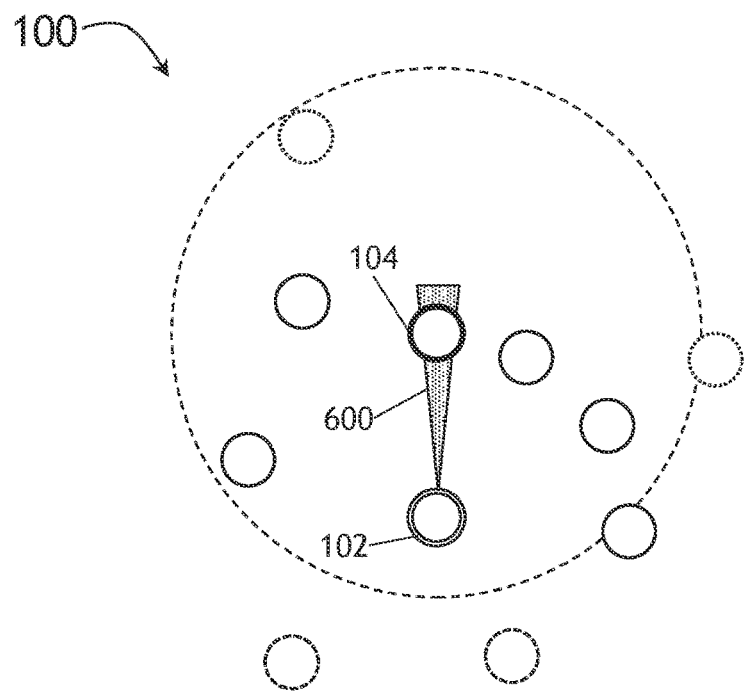
FIGS. 6A and 6B are diagrammatic illustrations of directional communications links between the Tx and Rx nodes of FIG. 5.
Figure 6B:
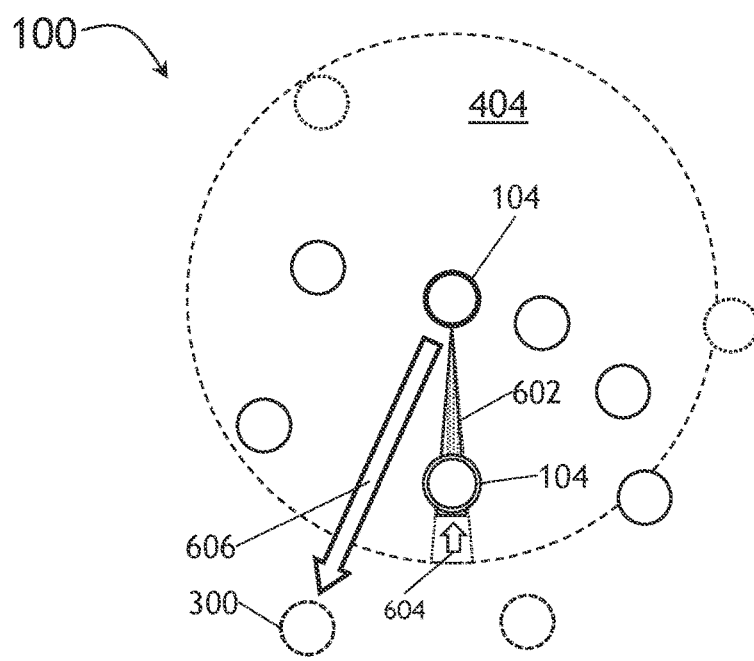

Referring also to FIGS. 6A and 6B, in embodiments the Tx node 102 may continue transmitting to the Rx node 104 via narrow-beam directional communications link 600, and the Rx node 104 may likewise continue transmitting to the Tx node 102 via narrow-beam directional communications link 602. In some embodiments, the Tx node 102 and/or Rx node 104 may adjust (604) their transmitting power to increase or reduce the size of their transmission range 404, e.g., to reduce or eliminate probability of detection or interception (e.g., LPD, LPI) by unknown or unfriendly nodes of signals transmitted between the Rx and Tx nodes. For example, one or both of the Tx node 102 and Rx node 104 may additionally determine a range or distance to the other node, e.g., an approximate range based on Doppler corrections with respect to the control messages (206, FIG. 2; 400, FIG. 4); a precise range based on two-way timing and ranging (TWTR) via a zero or near-zero Doppler path, as further disclosed in the co-pending application Ser. No. 18/198,025; or via other appropriate ranging means.

In some embodiments, either the Rx node 104 (e.g., or the Tx node 102, or other nodes within the network 100) may establish directional communications links to additional nodes 300 outside their transmission range 404, e.g., via short-flag signaling. For example, when the Rx node 104 (e.g., as a Tx node) is aligned with a receiver node (e.g., the additional long-range node 300 outside the transmission range 404 of the Rx node 104) with respect to Doppler null directions (e.g., there existing a zero or near-zero Doppler path 606 between, and known to, the two nodes) such that sensitivity is maximum, the Rx node 104 may exchange a flag, or bit, informing the additional node 300 that the Rx node 104 is ready to transmit via the zero or near-zero path 606. Similarly, when the Doppler null scanning direction is reversed and the additional node 300 is aligned with the Rx node 104 with respect to Doppler null directions, the additional node may indicate via flag/bit its readiness to receive transmissions. While, for example, a full DNS cycle may be needed to schedule medium access due to the need for Doppler nulling alignment, and additional information may be needed to distinguish between more than one node aligned with a particular Doppler null scan, signaling range may be extended beyond normal transmission range 404, the extended range comparable with beaconing range.

Figure 7A:
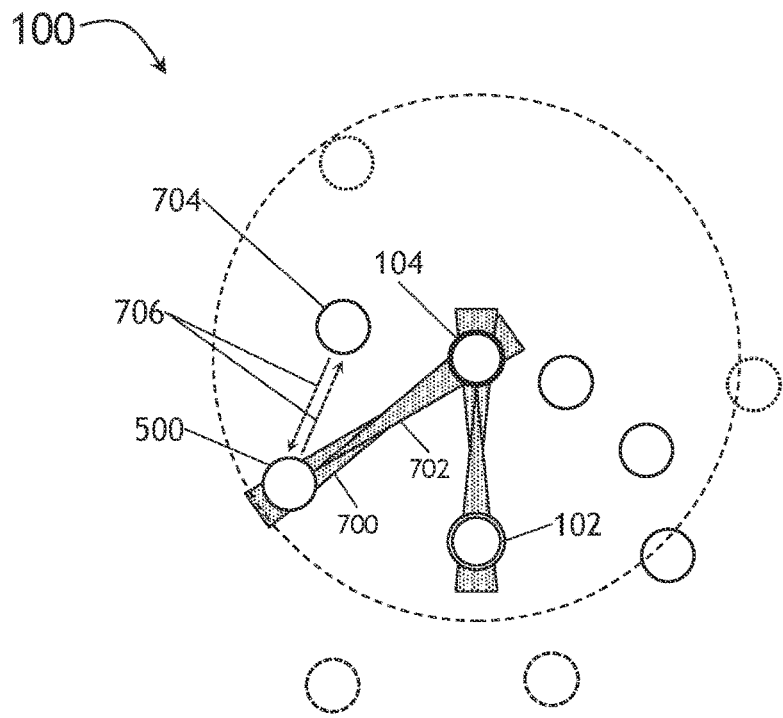
FIG. 7A is a diagrammatic illustration of node discovery and establishment of directional communications links between additional nodes of the network of FIG. 5.
Figure 7B:
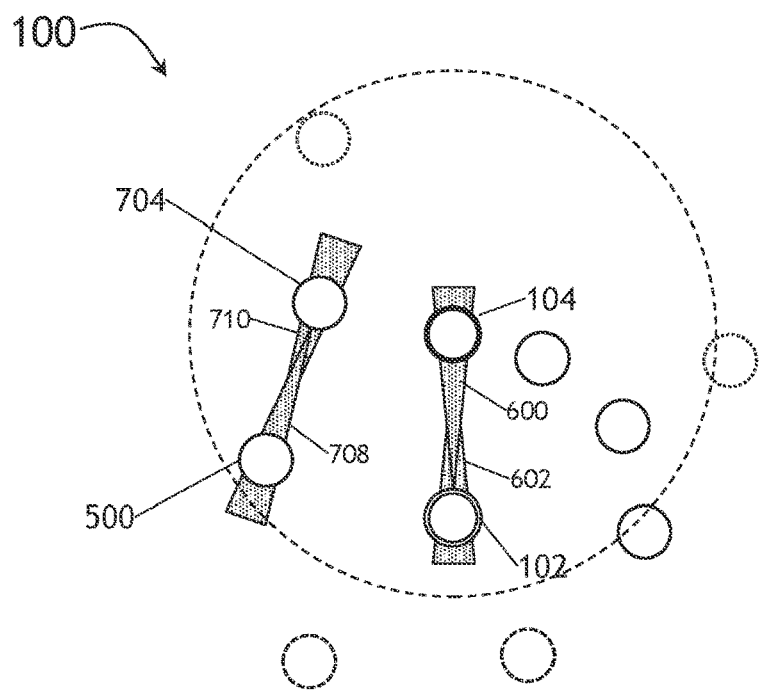
FIG. 7B is a diagrammatic illustration of spatial reuse of frequencies and/or frequency bands within the network of FIG. 5 according to example embodiments of this disclosure.

Referring also to FIG. 7A, in embodiments the additional node 500 may have determined bearings to the Tx node 102 and Rx node 104 respectively (e.g., via Doppler corrections with respect to the RTS (206. FIG. 2) and/or CTS (400, FIG. 4)) and the additional node and Tx node may likewise establish mutual directional communications links 700, 702. Referring also to FIG. 7B, the additional node 704 may be implemented and may function similarly to the additional node 500 of FIG. 7A, except that the additional nodes 500, 704 may likewise have mutually determined bearings 706 between each other (e.g., via Doppler corrections with respect to RTS and CTS transmitted by either additional node to the Tx node 102 or Rx node 104). Accordingly, the additional nodes 500 and 704, both having determined mutual bearings 706, may establish mutual directional communications links 708, 710. For example, the nodes 102, 104, 500, 704 may all have determined relative positioning and/or velocity vectors of the other nodes. In some embodiments, the Tx and Rx nodes 102, 104 may maintain directional communications links 600, 602 whereby transmissions are sent and received via a predetermined frequency or frequency band. Similarly, the additional nodes 500, 704, knowing the relative positioning and/or velocity vector information of the Tx and Rx nodes 102, 104, may re-use the predetermined frequency or frequency band for their own mutual directional communications links 708, 710. In embodiments, one or more of the nodes 102, 104, 500, 704 may determine that spatial re-use of the frequency or frequency band may be possible without interference between the directional communications links 600, 602, 708, 710, or one or more of the nodes may adjust, or may be directed to adjust, transmitting power to reduce or eliminate signal interference.

Figure 8:
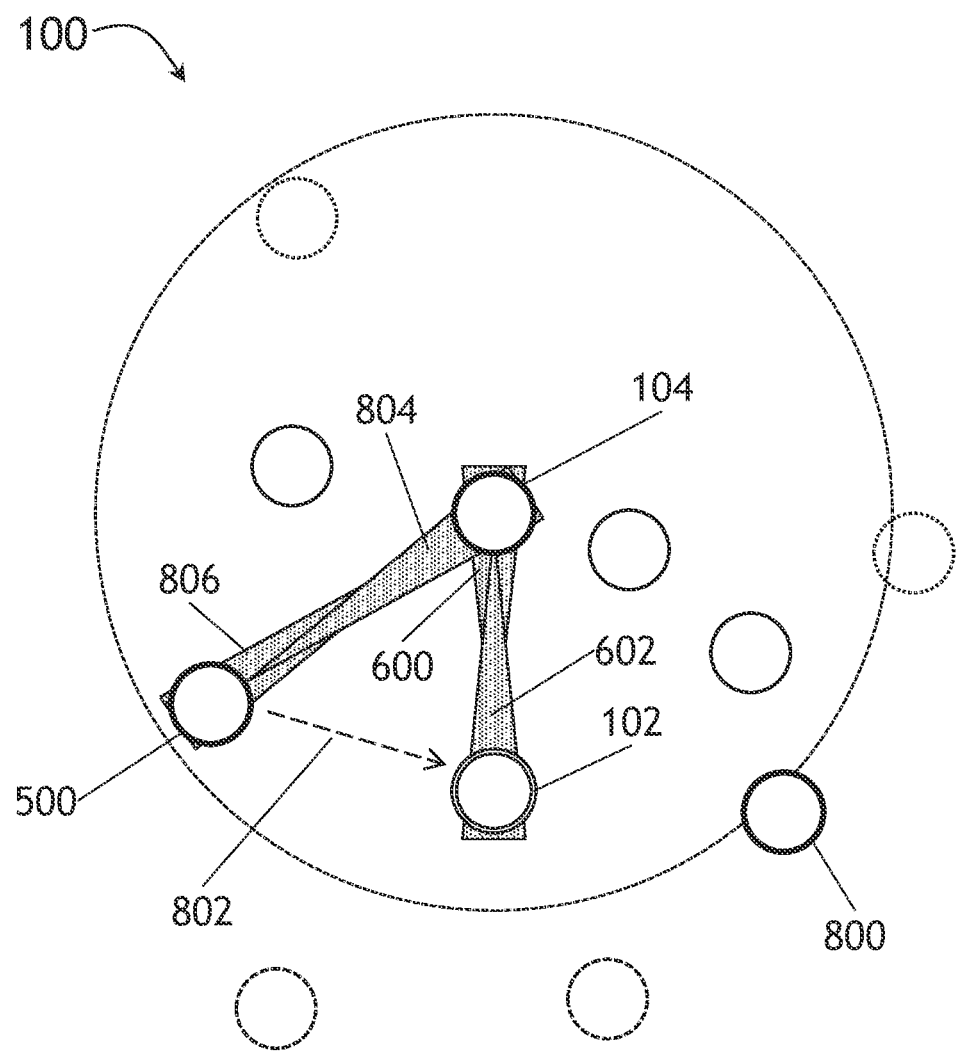
FIG. 8 is a diagrammatic illustration of an expendable or low value asset serving as a communications relay for a high-value node operating under radio silence or emissions control (EMCON) protocols according to example embodiments of this disclosure.

Referring now to FIG. 8, the additional node 500 may be a high-value asset (HVA) operating in a state of radio silence or according to emissions control (EMCON) protocols to reduce or eliminate the probability of detection, interference, or interception of signals transmitted by the additional node. For example, EMCON may include EMCON communication protocols. For instance, EMCON states may include, but are not necessarily limited to, EMCON DELTA, EMCON CHARLIE, EMCON BETA, and EMCON ALPHA states used in the military (e.g., navy). In embodiments, EMCON DELTA may mean no or minimal emission limitations and may be used during normal operations. In embodiments, EMCON CHARLIE may mean only mission-essential equipment is allowed to transmit. For example, sensors unique to the vessel may be turned off to prevent identification or classification by adverse nodes. In embodiments, EMCON BETA may mean even more limitations than EMCON CHARLIE, but some transmissions may still be allowed. In embodiments, EMCON ALPHA may mean complete radio silence, such that no nodes in such a state are allowed to transmit.

In embodiments, the additional node/HVA 500 may wish to establish directional communications to the Tx node 102, but may also wish to avoid detection and/or interception of transmissions by nodes 800 in the path of a directional communications link 802 between the additional node/HVA and the Tx node. As noted above, the additional node/HVA 700, the Tx node 102, and the Rx node 104 (the latter two nodes having established directional communications links (600, 602; FIGS. 6A-B)) may each know relative position and/or velocity vector information of the other nodes.

In embodiments, the Rx node 104 may be a low-value asset (LVA) or expendable asset, e.g., a mobile uncrewed aircraft system (UAS) or uncrewed aerial vehicle (UAV) or other uncrewed mobile platform. Accordingly, the Rx node 104 may receive transmissions from the additional node/HVA 500 via directional communications link 804, relaying received transmissions to the Tx node 102 via directional communications link 602. Similarly, the Tx node 102 may communicate with the additional node/HVA 500 by transmitting to the Rx node 104 via the directional communications link 600; the Rx node may relay transmitted messages to the additional node/HVA via directional communications link 806, reducing or avoiding in both directions the probability of signal detection and/or interception by the node 800.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A system, comprising:
   at least two nodes including a transmitter (Tx) node and a receiver (Rx) node, wherein each node comprises:
      a communications interface including at least one omnidirectional antenna element; and
      a controller operatively coupled to the communications interface, the controller including one or more processors, wherein the controller has information of own-node velocity and own-node orientation;
   wherein each node is in motion relative to each other and to a common reference frame;
   wherein each node is time synchronized to apply Doppler corrections associated with the motion of said node relative to the common reference frame;
   wherein the common reference frame is known to each node prior to the Tx node transmitting signals to the Rx node and prior to the Rx node receiving the signals from the Tx node;
   wherein at least the Rx node is configured to:
      receive at least one first control message transmitted by the Tx node, the first control message associated with a directional communications link from the Tx node to the Rx node;
      determine a bearing from the Rx node to the Tx node based on one or more Doppler corrections associated with the first control message;
      establish a directional communication link to the Tx node based on the determined bearing; and
      transmit at least one second control message in response to the received first control message.

2. The system of claim 1, wherein:
   the at least one first control message includes at least one Request to Tune (RTT); and
   the at least one second control message includes at least one Response to Tune.

3. The system of claim 1, wherein:
   the at least one first control message includes at least one Request to Send (RTS); and
   the at least one second control message includes at least one Clear to Send (CTS).

4. The system of claim 1, wherein the Tx node is configured to:
   determine a bearing to the Rx node based on Doppler corrections associated with the received second control message; and
   establish the directional communications link to the Rx node based on the determined bearing.

5. The system of claim 4, wherein the Tx node is further configured to determine a range from the Tx node to the Rx node.

6. The system of claim 1, wherein the at least two nodes further comprise:
   at least a first additional node and a second additional node configured to determine, based on at least one of the first control message, the second control message, or the one or more Doppler corrections:
      a first bearing to the Tx node;
      a second bearing to the Rx node; and
      at least one third bearing between the first and second additional nodes based on the one or more Doppler corrections.

7. The system of claim 6, wherein the first and second additional nodes are configured to establish mutual directional communications links based on the at least one third bearing.

8. The system of claim 7, wherein:
   the directional communications links between the Tx and Rx nodes are associated with at least one frequency band; and
   the mutual directional communications links established between the first and second additional nodes are associated with the at least one frequency band.

9. The system of claim 1, wherein:
   the Tx node has at least one first directional communications link to a silent node of the two or more nodes, the silent node associated with at least one of a state of reduced emissions or a state of radio silence;
   the Tx node has at least one second directional communications link to an additional node of the two or more nodes; and
   the Tx node is configured to relay one or more transmissions between the silent node and the additional node via the first directional communications link.

10. The system of claim 1, wherein the Rx node is further configured to determine a range from the Rx node to the Tx node.

11. The system of claim 1, wherein the Rx node is configured to adjust a receiver frequency of the Rx node according to an own speed and an own velocity direction of the Rx node so as to perform a receiver-side Doppler correction.

12. The system of claim 11, wherein an amount of adjustment of the adjusted receiver frequency is proportional to an Rx node velocity projection onto a Doppler null direction.

13. The system of claim 12, wherein the Rx node is configured to determine a relative speed between the Tx node and the Rx node.

14. The system of claim 13, wherein the Rx node is configured to determine a direction that the Tx node is in motion and a velocity vector of the Tx node.

15. The system of claim 14, wherein a maximum net frequency shift for a Doppler correction by the Rx node occurs when a resultant vector is parallel to a Doppler null direction, wherein the resultant vector is equal to a velocity vector of the Rx node minus the velocity vector of the Tx node.

16. The system of claim 14, wherein a minimum net frequency shift for a Doppler correction by the Rx node occurs when a resultant vector is antiparallel to a Doppler null direction, wherein the resultant vector is equal to a velocity vector of the Rx node minus the velocity vector of the Tx node.

17. The system of claim 1, wherein each node of the Tx node and the Rx node are in relative motion in two or three dimensions.

\* \* \* \* \*